US011190965B2

(12) United States Patent
Ramos de Azevedo

(10) Patent No.: US 11,190,965 B2
(45) Date of Patent: Nov. 30, 2021

(54) SYSTEMS AND METHODS FOR PREDICTIVE CONNECTION SELECTION IN A NETWORK OF MOVING THINGS, FOR EXAMPLE INCLUDING AUTONOMOUS VEHICLES

(71) Applicant: Veniam, Inc., Mountain View, CA (US)

(72) Inventor: João Luís Mineiro Ramos de Azevedo, Cascais (PT)

(73) Assignee: VENIAM, INC., Mountain View, CA (US)

(*) Notice: Subject to any disclaimer, the term of this patent is extended or adjusted under 35 U.S.C. 154(b) by 547 days.

(21) Appl. No.: 15/627,792

(22) Filed: Jun. 20, 2017

(65) Prior Publication Data

US 2018/0124631 A1   May 3, 2018

Related U.S. Application Data

(60) Provisional application No. 62/415,253, filed on Oct. 31, 2016.

(51) Int. Cl.
| | |
|---|---|
| *G06F 15/173* | (2006.01) |
| *H04W 28/02* | (2009.01) |
| *H04W 64/00* | (2009.01) |
| *H04W 36/32* | (2009.01) |
| *H04W 40/18* | (2009.01) |
| *H04W 36/00* | (2009.01) |

(52) U.S. Cl.
CPC ....... *H04W 28/0226* (2013.01); *H04W 36/32* (2013.01); *H04W 40/18* (2013.01); *H04W 64/006* (2013.01); *H04W 36/0083* (2013.01)

(58) Field of Classification Search
CPC . H04W 28/0226; H04W 36/32; H04W 40/18; H04W 64/006; H04W 36/0083
USPC ........................................................ 709/226
See application file for complete search history.

(56) References Cited

U.S. PATENT DOCUMENTS

| | | | | |
|---|---|---|---|---|
| 7,574,217 | B1 * | 8/2009 | Leung | H04W 24/02 455/456.1 |
| 2008/0042912 | A1 * | 2/2008 | Lee | H04L 12/4641 343/713 |
| 2013/0035051 | A1 * | 2/2013 | Mujtaba | H04B 7/0808 455/277.2 |
| 2013/0288675 | A1 * | 10/2013 | Gassend | H04W 36/30 455/434 |

(Continued)

OTHER PUBLICATIONS

W. Shen and Q. Zeng, "Cost-Function-Based Network Selection Strategy in Integrated Wireless and Mobile Networks," in IEEE Transactions on Vehicular Technology, vol. 57, No. 6, pp. 3778-3788, Nov. 2008 (Year: 2008).*

(Continued)

*Primary Examiner* — Taylor A Elfervig
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

26 Claims, 12 Drawing Sheets

(56) References Cited

U.S. PATENT DOCUMENTS

| | | | |
|---|---|---|---|
| 2014/0293829 A1* | 10/2014 | Visuri | H04L 12/145 370/254 |
| 2016/0127924 A1* | 5/2016 | Lee | H04W 24/02 370/252 |
| 2017/0054601 A1* | 2/2017 | Affoneh | H04L 41/0869 |
| 2017/0257823 A1* | 9/2017 | Ashwood-Smith | H04B 17/12 |
| 2018/0302884 A1* | 10/2018 | Dong | H04W 48/08 |
| 2019/0090174 A1 | 3/2019 | Rocci et al. | |

OTHER PUBLICATIONS

E. K. Paik, S. Y. Heo, H. Kim, J. S. Jin, S. Lee and S. H. Lee, "Seamless Vertical Handover Using Multihomed Mobile Access Point," IEEE GLOBECOM 2008—2008 IEEE Global Telecommunications Conference, 2008, pp. 1-4 (Year: 2008).*

A. Cardote, S. Sargento and P. Steenkiste, "On the connection availability between relay nodes in a VANET," 2010 IEEE Globecom Workshops, 2010, pp. 181-185 (Year: 2010).*

B. Pfitzinger, T. Baumann and T. Jestädt, "Network Resource Usage of the German Toll System: Lessons from a Realistic Simulation Model," 2013 46th Hawaii International Conference on System Sciences, 2013, pp. 5115-5122 (Year: 2013).*

K. Su, H. Wu, W. Chang and Y. Chou, "Vehicle-to-Vehicle Communication System through Wi-Fi Network Using Android Smartphone," 2012 International Conference on Connected Vehicles and Expo (ICCVE), 2012, pp. 191-196 (Year: 2012).*

N. Akhtar, S. C. Ergen and O. Ozkasap, "Vehicle Mobility and Communication Channel Models for Realistic and Efficient Highway VANET Simulation," in IEEE Transactions on Vehicular Technology, vol. 64, No. 1, pp. 248-262, Jan. 2015 (Year: 2015).*

K. M. Alam, M. Saini, D. T. Ahmed and A. El Saddik, "VeDi: A vehicular crowd-sourced video social network for VANETs," 39th Annual IEEE Conference on Local Computer Networks Workshops, 2014, pp. 738-745 (Year: 2014).*

K. M. Alam, M. Saini and A. E. Saddik, "Toward Social Internet of Vehicles: Concept, Architecture, and Applications," in IEEE Access, vol. 3, pp. 343-357, 2015 (Year: 2015).*

Li et al., "When Smart Phone Meets Vehicle: A New On-Board Unit Scheme for VANETs," 2015 IEEE International Conference on Computer and Information Technology; Ubiquitous Computing and Communications; Dependable, Autonomic and Secure Computing; Pervasive Intelligence and Computing, 2015, pp. 1095-1100 (Year: 2015).*

* cited by examiner ed to, and claims benefit from U.S. Provisional Patent Application Ser. No. 62/415,253, filed on Oct. 31, 2016, and titled "Systems and Methods for Predictive Connection Selection in a Network of Moving Things," which is hereby incorporated herein by reference in its entirety.

SYSTEMS AND METHODS FOR PREDICTIVE CONNECTION SELECTION IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/415,253, filed on Oct. 31, 2016, and titled "Systems and Methods for Predictive Connection Selection in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
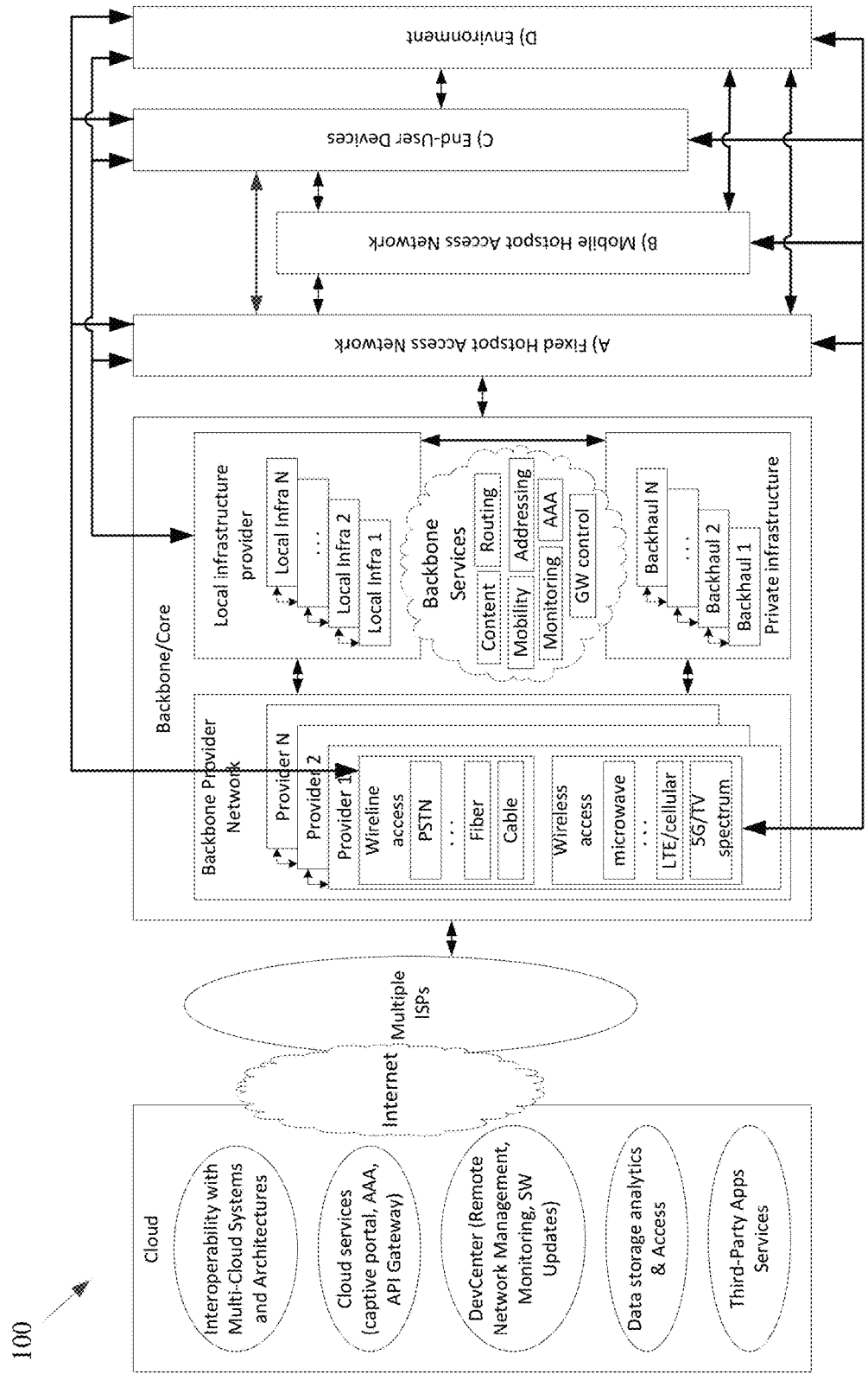
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for providing dynamic and predictive selection of communication pathways or connections in a communication network comprising a complex array of both static and moving communication nodes (e.g., the Internet of moving things).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components.

For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
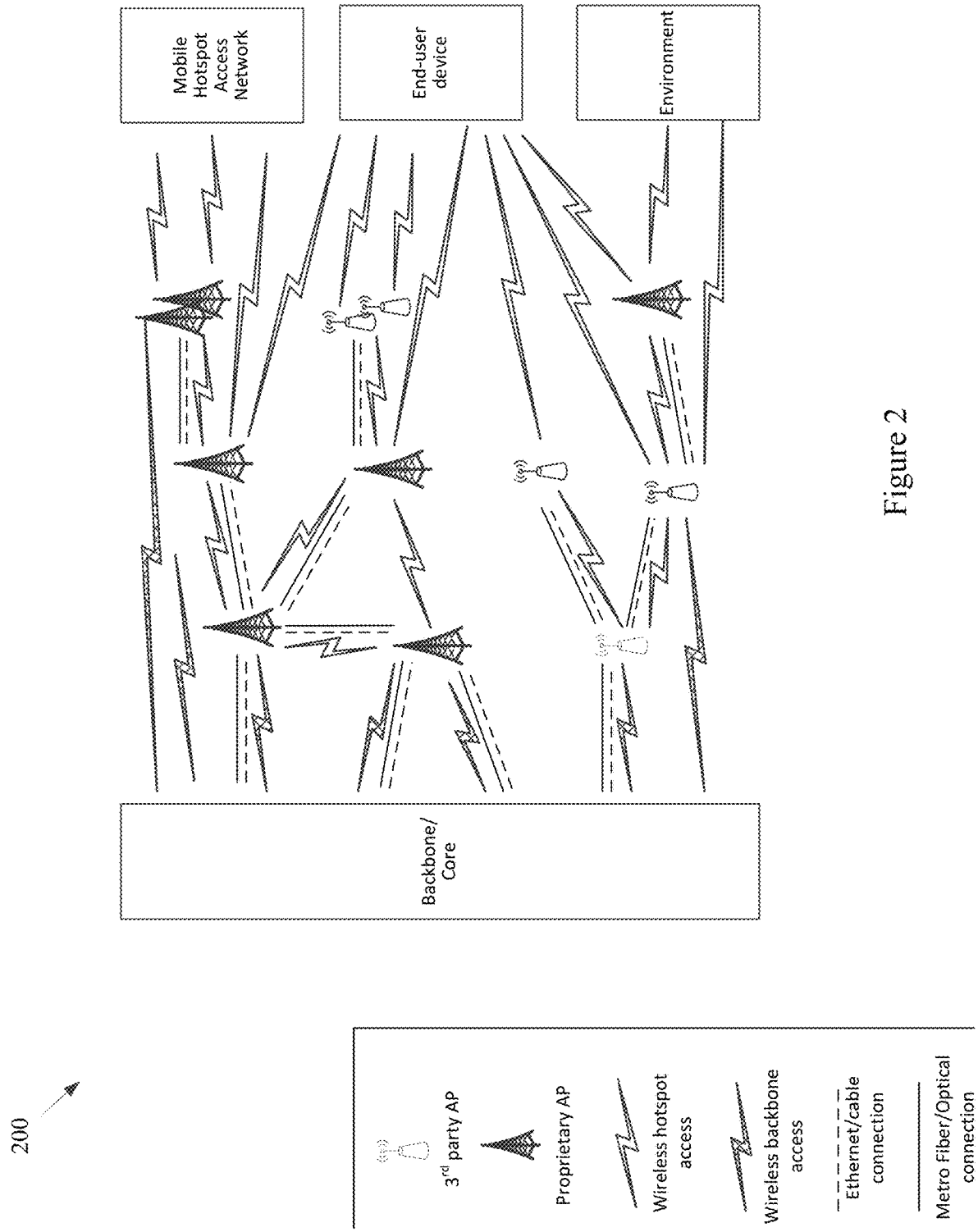
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
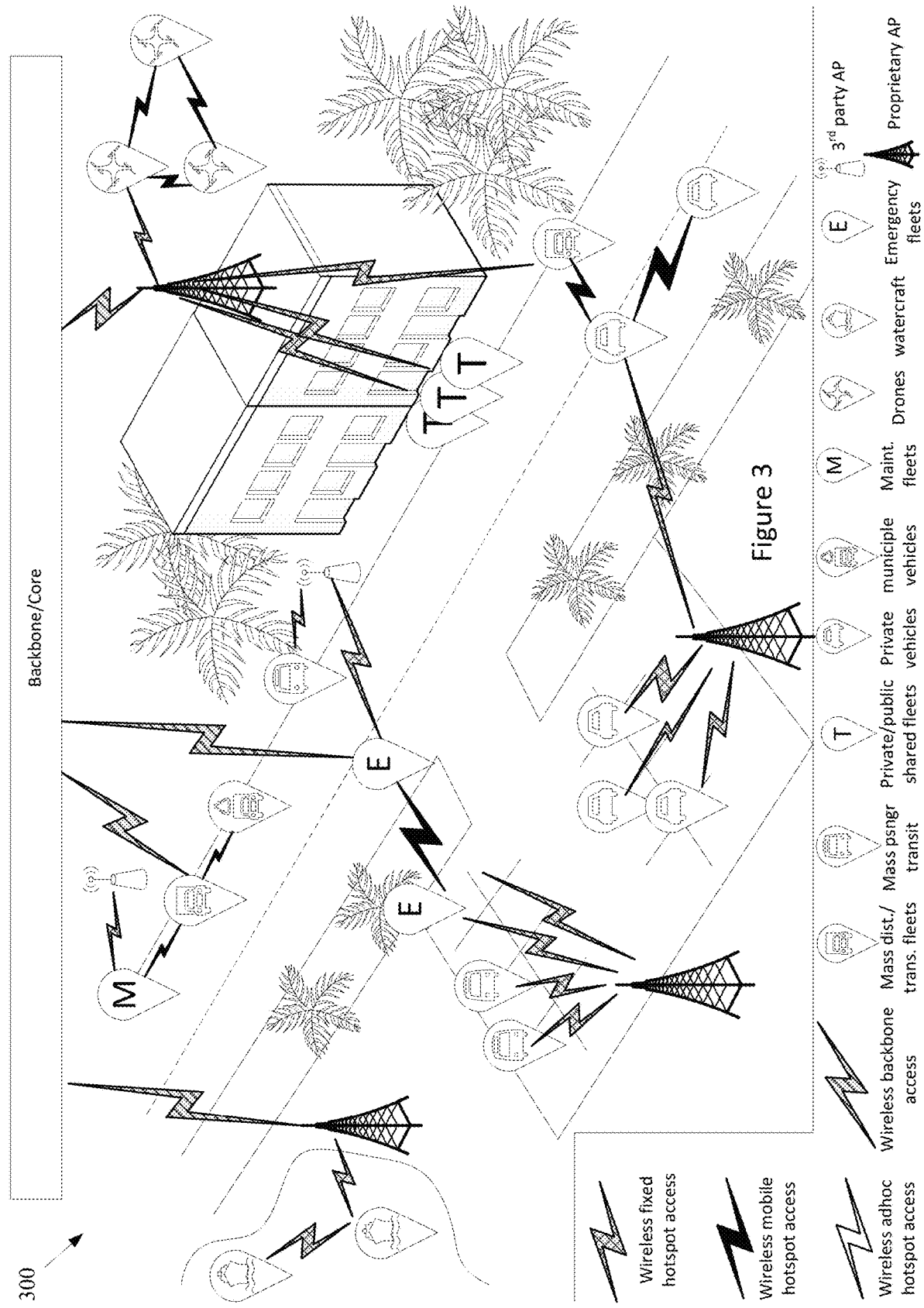
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
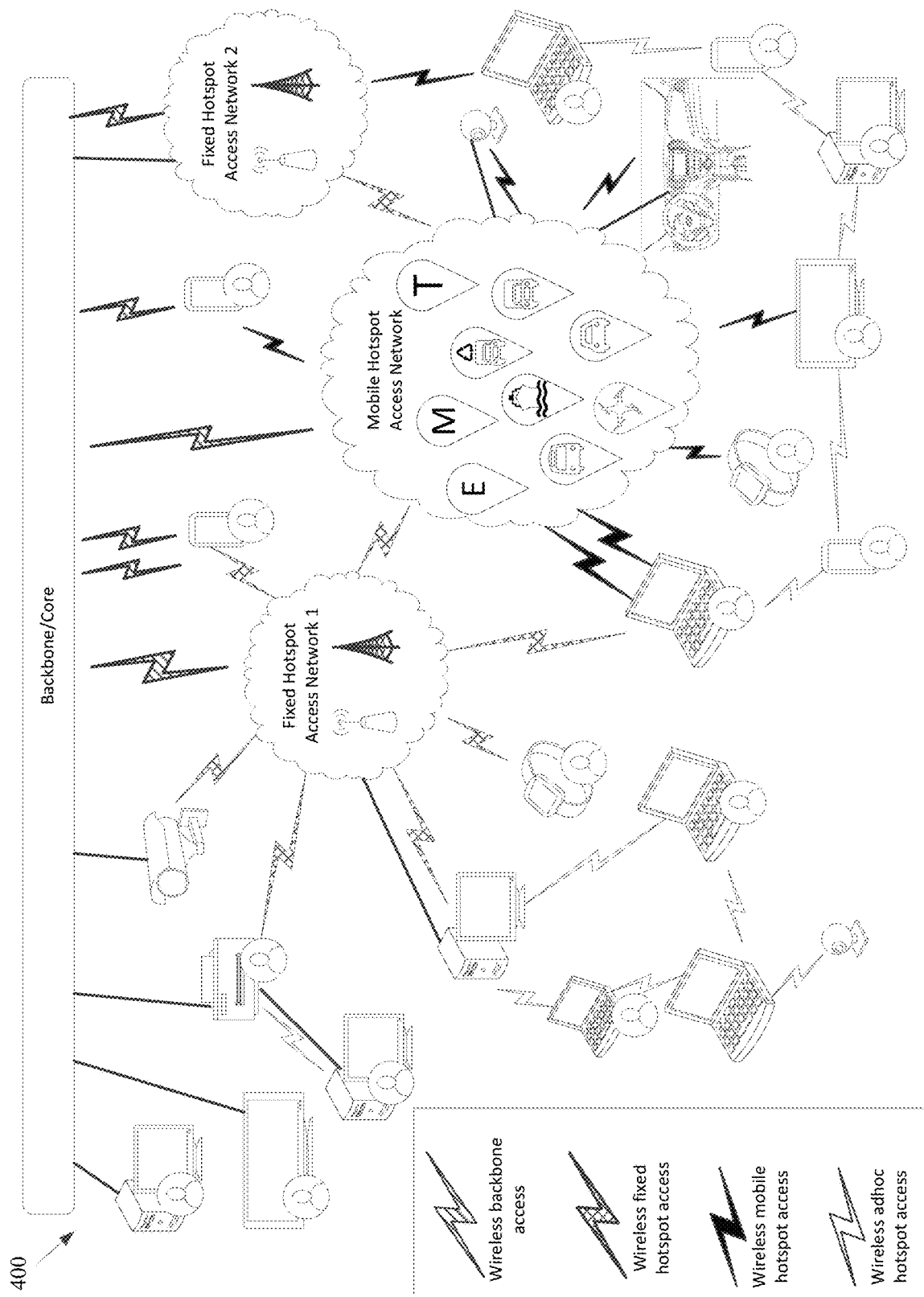
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
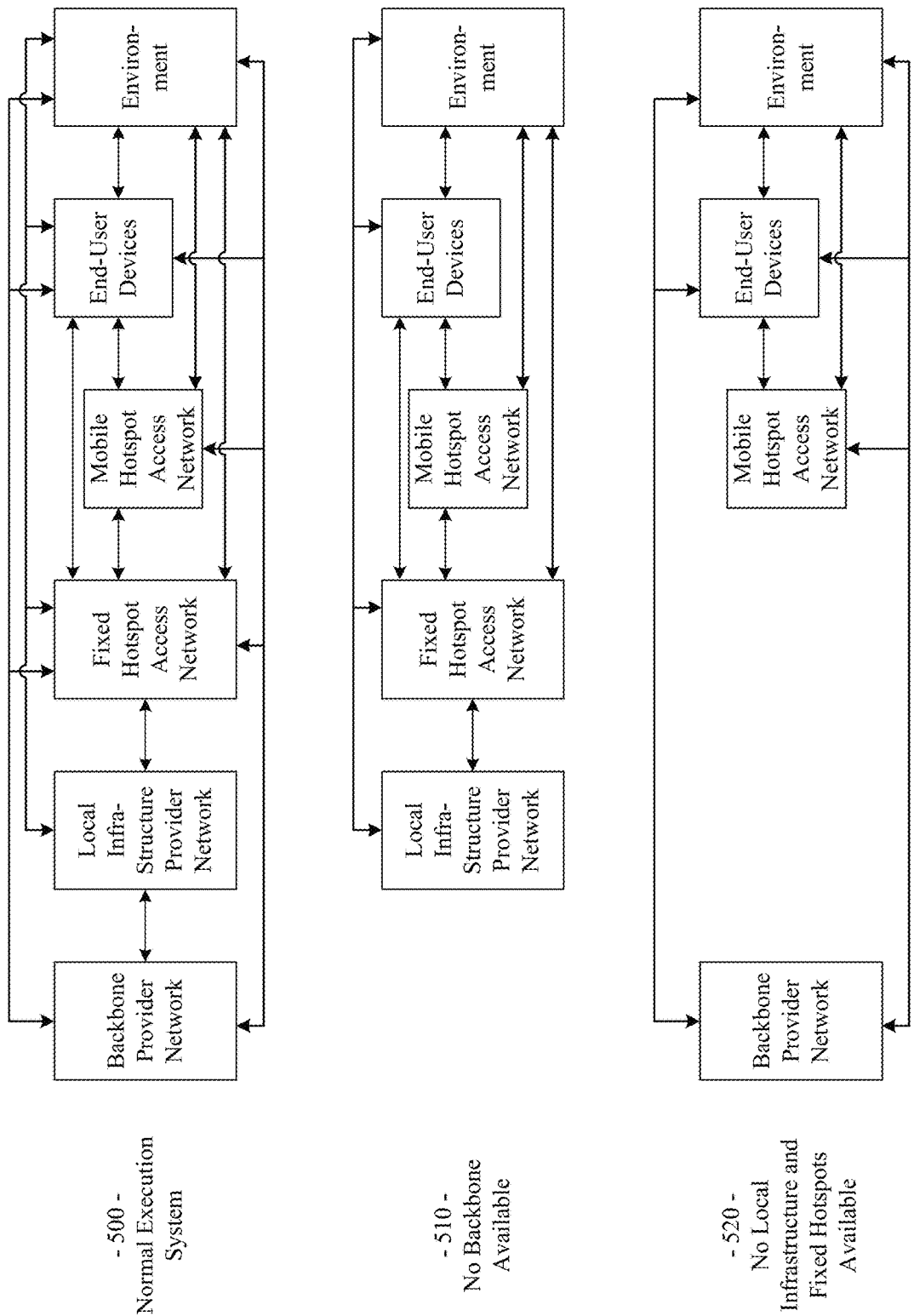
FIGS. 5A-5C show a plurality of network configurations illustrating the flexibility and/or and resiliency of a communication network, in accordance with various aspects of this disclosure.
Figure 5B:
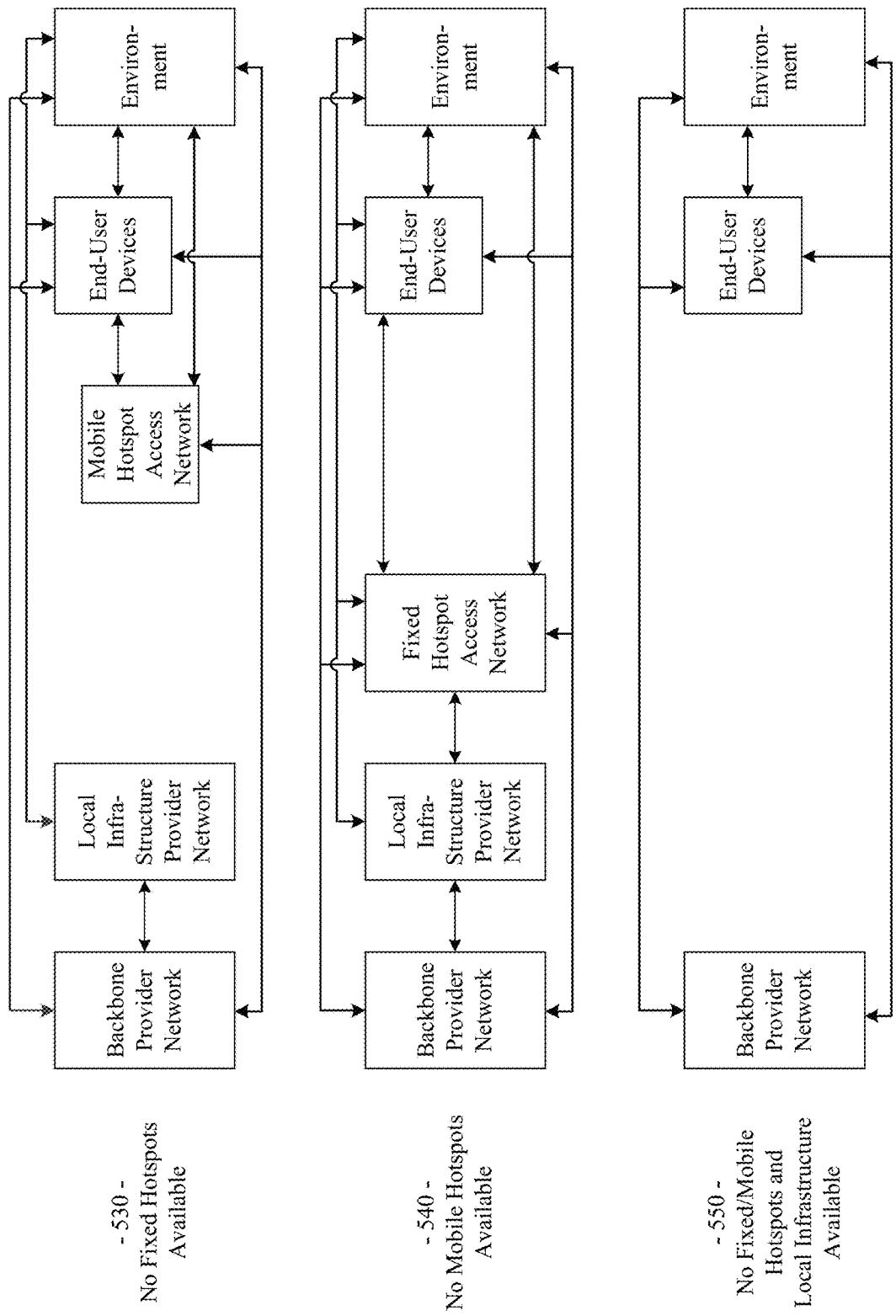
Figure 5C:
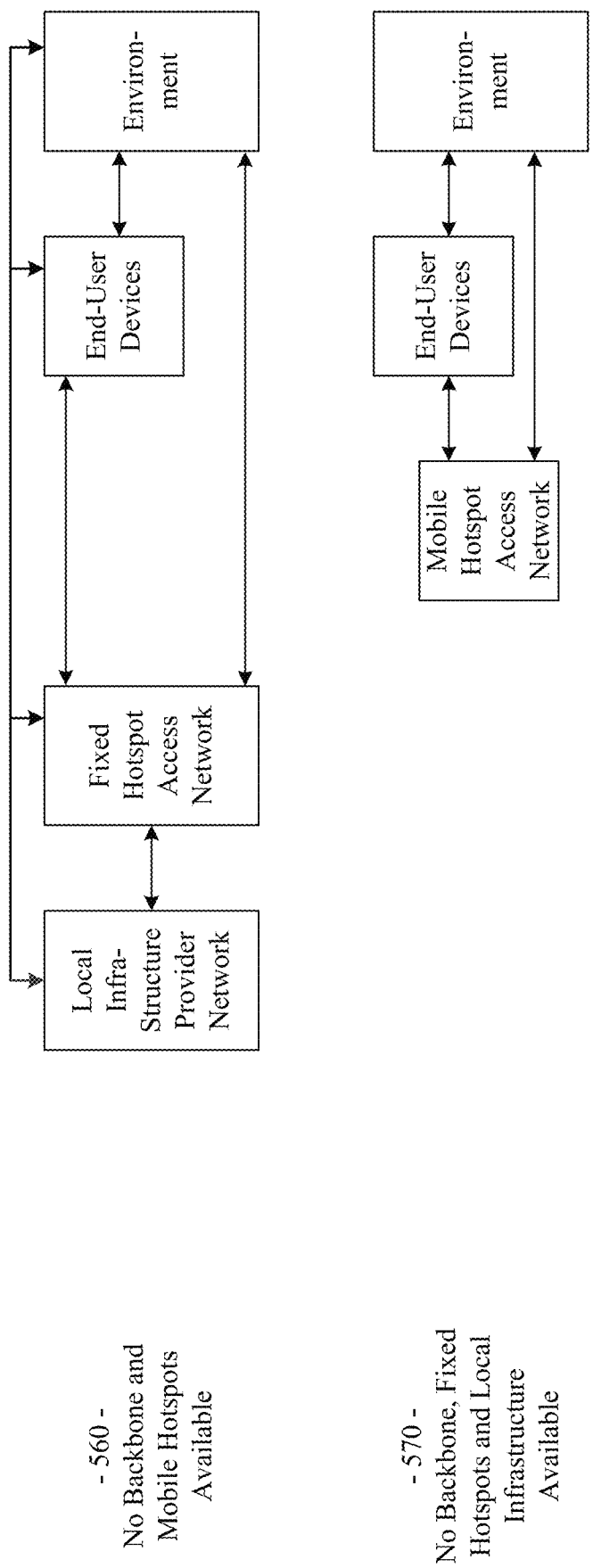

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
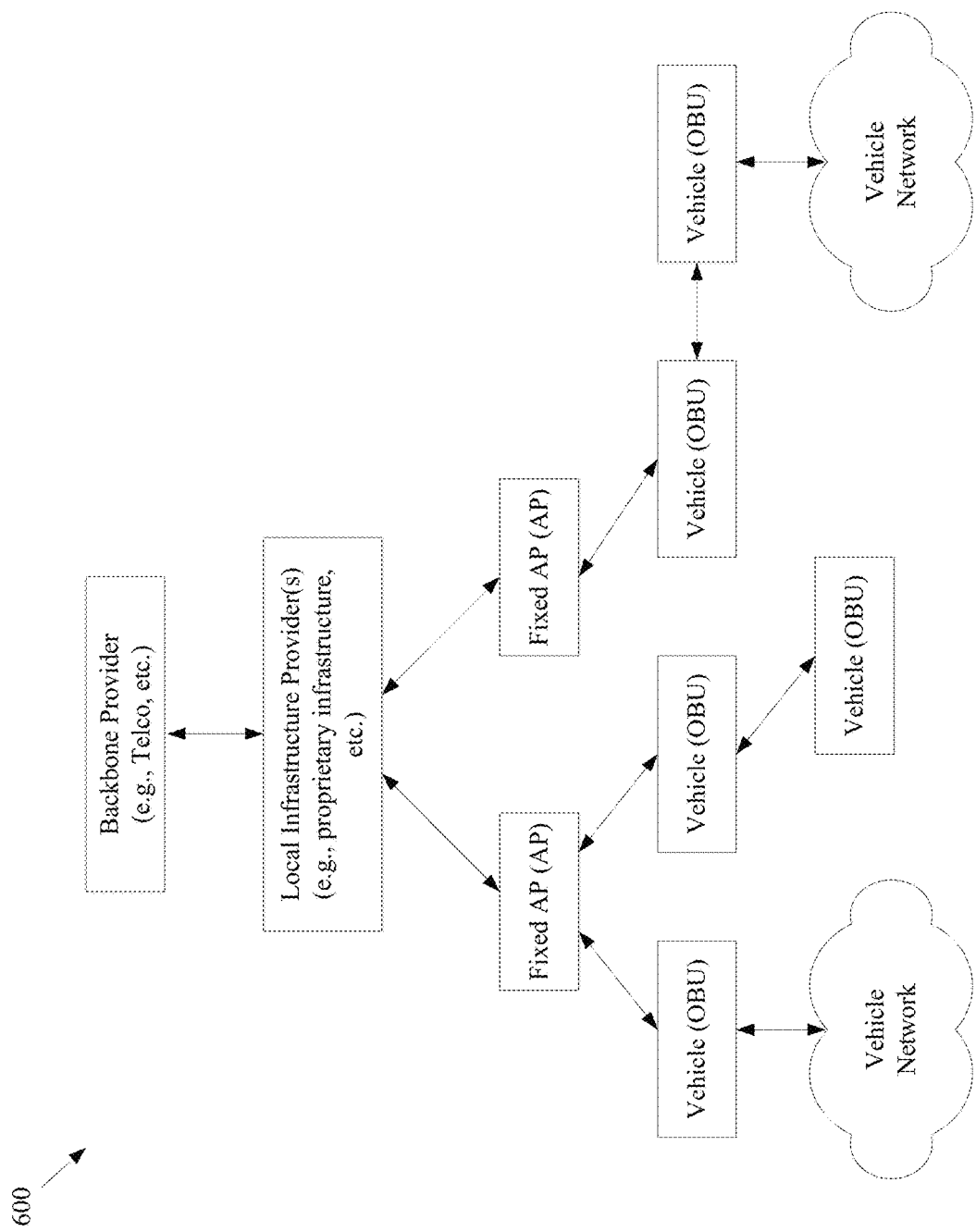
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, nodes, networks and/or network components 100, 200, 300, 400, 500-570, 700, 800, 900, and 1000, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Various aspects of the present disclosure provide communication network architectures, systems and methods for supporting a network of mobile and/or static nodes. As a non-limiting example, various aspects of this disclosure provide communication network architectures, systems, and methods for providing dynamic routing and/or selection of communication pathways in a communication network comprising a complex array of both static and moving communication nodes (e.g., the Internet of moving things).

Various aspects of the present disclosure provide a self-healing and distributed routing functionality that can be present on every node belonging to each network (e.g., Cloud Network(s), Backbone/Core Network(s), Fixed AP (or Fixed Access) Network(s), Mobile AP (or Mobile Access) Network(s), User (or End-User Devices) Network(s), Sensor Network(s), etc.) that is part of the Network of Moving Things. Such routing functionality may, for example, be driven by any of a variety of models (e.g., a traffic-based model, network-based model, vehicular/mobility-based model, QoS-based model, client-based model, energy conservation-based model, any combination thereof, etc.) and/or complex functions.

As discussed herein a communication system may comprise a set of any of a variety of different networks (or portions thereof) that support the Network of Moving Things. Many non-limiting example characteristics of such networks (or portions thereof) are presented herein (e.g., with regard to FIGS. 1-10, etc.).

For example, non-limiting examples and/or characteristics of Cloud Networks are provided herein (e.g., at Cloud of FIG. 1, etc.). A Cloud Network may, for example, comprise any or all of a variety of different types of nodes. For example, a Cloud Network may comprise any or all kinds of virtual/Web machines in which SW services are deployed (e.g., authentication, accounting, monitoring, management, etc.), for example services utilized to control any or all the networks remotely. Also, the Cloud Network may also comprise the data/content storage, analytics, processing, visualization services, etc., utilized by any or all of the applications and services running in any or all of the different types of client devices, servers, sensors and other machines operating in any of a variety of environments. Through the Cloud, third parties may, for example, access such services. Such services may, for example, be agnostic to the type of Cloud provider.

Also for example non-limiting examples and/or characteristics of the Backbone/Core Networks are provided herein (e.g., at Backbone/Core of FIG. 1, at Backbone/Core of FIG. 2, at Backbone/Core of FIG. 3, at Backbone/Core of FIG. 4, at Backbone Provider Network of FIGS. 5A-5C, at Backbone Provider of FIG. 6, etc.). A Backbone/Core Network may, for example, comprise any one or more of a variety of types of wireline networks, fiber networks, a combination of wireless and wireline networks, etc. For example, the Backbone/Core Networks may be architected and/or configured such that optimal network conditions (e.g., highest throughput, lowest latency, highest redundancy, highest availability, etc.) are achieved when connecting to multiple other client networks or subnetworks, which may also be referred to herein as access networks (e.g., Fixed Access (or Fixed AP) networks, Mobile Access (or Mobile AP) networks, etc.), any of a variety of types of User Networks, any of a variety of types of Sensor Networks, etc. Such Backbone/Core Networks may, for example, be specialized (or specifically adapted or configured) to communicate with specific types of client devices or client servers in a variety of environments.

Additionally for example, non-limiting examples and/or characteristics of Fixed AP (or Fixed Access) Networks are provided herein (e.g., at the Fixed Hotspot Access Network of FIG. 1, at the APs of FIG. 2, at the $3^{rd}$ party APs and Proprietary APs of FIG. 3, at the Fixed Hotspot Access Networks of FIG. 4, at the Fixed Hotspot Access Networks of FIGS. 5A-5C, at the Fixed APs of FIG. 6, etc.).

Many example configurations of Fixed AP (or Fixed Access) Networks are presented herein (e.g., at FIG. 2, etc.). A Fixed AP Network may, for example, comprise a variable number of RSUs that are in range, not in range, partially in range, etc., of Mobile APs. Each of such RSUs may, for example, be working properly or not working property (e.g., due to hardware and/or software issues, etc.), and may be connected to the Backbone/Core Network through direct communications or via one or more wireless (mesh) links. Those wireless connections can span from single DSRC, multiple DSRC, DSRC+WiFi, WiFi only, proprietary high bandwidth radio, any combination thereof, etc.

Further for example, non-limiting examples and/or characteristics of Mobile AP (or Mobile Access) Networks are provided herein (e.g., at Mobile Hotspot Access Network of FIG. 1, at Mobile Hotspot Access Network of FIG. 2, at any or all of the vehicles of FIG. 3, at Mobile Hotspot Access Network of FIG. 4, at Mobile Hotspot Access Networks of FIGS. 5A-5C, at the Vehicles (or OBUs) of FIG. 6, etc.).

Many example configurations of Mobile AP (or Mobile Access) Networks are presented herein (e.g., at FIG. 3, etc.). A Mobile AP Network may, for example, comprise a variable number vehicles equipped with an on-board unit (OBU). Such vehicles may, for example, be spread around a city and/or may be densely located in some places (e.g., depots, parking spots, downtown area, etc.). Mobile AP Networks (or Mobile APs thereof) may, for example, be directly connected to Fixed APs, user devices, sensors, etc., though direct or multi-hop wireless links utilizing any communication technology available, as well as to the Backbone/Core Network (e.g., via cellular links, etc.).

Still further for example, non-limiting examples and/or characteristics of User Networks are provided herein (e.g., at End-User Devices of FIG. 1, at End-user device of FIG. 2, at any or all of the large variety of user devices shown in FIG. 4, at the End-User Devices of FIGS. 5A-5C, in the Vehicle Network of FIG. 6, etc.).

Many example configurations of User Networks (or User-Device Networks) are presented herein (e.g., at FIG. 4, etc.). Any of a variety of different types of mobile devices (e.g., smartphones, tablets, smartwatches, laptops, webcams, etc.) and/or static networked devices (e.g., monitoring panels, CCTV/IP cameras, HDD, smart TVs, printers, etc.) can be connected to distinct Backbone/Core Networks, Fixed AP Networks, Mobile AP Networks, etc., using the same or different wired/wireless technologies. A device can act as an AP to provide simultaneous access to multiple devices/things, which can then form ad hoc networks, interconnecting devices ultimately connected to distinct Backbone/Core, Fixed Access, and/or Mobile Access Networks. Devices may, for example, comprise redundant technologies to access distinct Backbone/Core, Fixed Access, and/or Mobile Access Networks for fault-tolerance and/or load-balancing purposes (e.g., utilizing multiple SIM cards, etc.). A device may, for example, simultaneously access distinct Backbone/Core, Fixed Access, and/or Mobile Access Networks, which may for example belong to a same provider or different respective providers. A device may, for example, provide multiple accesses to another device/thing (e.g., utilizing different channels and/or radios, etc.).

Non-limiting examples and/or characteristics of Sensor Networks are provided herein (e.g., at Environment of FIG. 1, at Environment of FIG. 2, at Environment of FIGS. 5A-5C, as part of the Vehicle Network of FIG. 6, etc.).

Many example configurations of Sensor Networks are presented herein (e.g., at FIG. 3, etc.). Sensor Networks may, for example, be deployed in cities or other urban areas and controlled spaces, be deployed for many environments and purposes, such as automation/in-vehicle systems, port/maritime networks, controlled spaces, survivable networks, military/aircraft/agtech networks, smart cities (WiFi on-the-move, municipalities, data harvesting), road management, traffic/lights optimization, waste management, ads management, tunnels/parking management, etc.

Any or all of such networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.) may be overlapped and/or connected to each other simultaneously, such that all modes of operation of a dynamic mesh environment can run in parallel, covering simultaneous (or concurrent) requirements of different users, clients, fleets, types of data, networking functions, etc. Non-limiting example mesh modes of operation are illustrated in FIGS. 5A-5C, any or all of which may run in parallel or not.

Within each network, there can be different network elements, which can be connected directly or in a multi-hop/mesh manner to other elements that belong to the same or different networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.). For example, there may be a mesh mode of operation that comprises: [OBU<->n*OBUs<->m*RSUs<->o*Backbone_links<->Cloud], where n, m and o can range from 0 to thousands.

Any of a variety of different types of connections may be formed (or established or triggered, etc.) by (or among) the different elements of each network, examples of which are provided below. Though the examples are characterized for the upstream (or upload) direction, for example coming from the edge to the backbone networks, the downstream (or download) direction also applies.

An example connection, for example from a point of view (or perspective) of a sensor, may be connected through: Cellular to one or more backend machines or other nodes; WiFi/DSRC to one or more end-user devices, or to one or more Mobile APs passing nearby, or to one or more Fixed APs, etc.; Ethernet to one or more Fixed APs or to one or more Mobile APs (for example, for an on-board sensor, etc.); etc.

Another example connection, for example from a point of view (or perspective) of a user device, may be connected through: Cellular to one or more backend machines or other nodes; WiFi/DSRC to one or more Mobile APs passing nearby, or to one or more Fixed APs, or to one or more end-user devices forming an ad-hoc network, etc.; Ethernet to one or more Fixed APs or to one or more Mobile APs (for example, for a laptop computer, etc.); etc.

Still another example connection, for example from a point of view of a Mobile AP, may be connected through: Cellular to one or more backend machines or other nodes; WiFi/DSRC to one or more Mobile APs passing nearby, or to one or more Fixed APs, or to one or more end-user devices that make their cellular connection available; etc.

Yet another example connection, for example from a point of view of a Fixed AP, may be connected through: Cellular to one or more backend machines (for example, if no fixed infrastructure is available); WiFi/DSRC to one or more Fixed APs located nearby; Ethernet to one or more backend machines; etc.

An example connection, for example from a point of view of a backend machine (or other node), may be connected through: Ethernet to one or more Cloud machines (or other nodes), or to one or more backend machines (or other nodes); Cellular to one or more backend machines (or other nodes) (for example, if no fixed infrastructure is available); etc.

Another example connection, for example, from a point of view of a Cloud machine (or other node), may be connected through: Ethernet to one or more Cloud machines (or other nodes), or to one or more backend machines (or other nodes); etc.

The communication flows/paths that are built on top of each mode of operation can be optimized in design and implementation for different scenarios and purposes, from different networking functions (e.g., session control, security, path control, service control, load control, etc.), which may have different respective goals based on the purpose of each networking function (e.g., very high capacity, lowest cost, certain levels of features regarding resiliency, self-healing capability, fault-tolerance, robustness, availability, security, etc.). To this end, various aspects of the present disclosure provide for nodes to detect, gather, and share the context information that will allow them to select the best the link/path to perform any kind (or a particular kind) of networking function.

In this discussion, various aspects of the context that can influence the decision are described, along with the global optimization of the communication paths, as well as the policies/metrics that can influence the path optimization.

From a point of view of an element (or node or device) that is part of each network belonging to the overall communication system, a set of attributes may be used to characterize its networking features, behavior, characteristics, etc., as well as the links that it can establish with accessible or nearby elements from the same or other networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.).

From a point of view of an element from any type of network, it can have available different technologies (e.g., communication technologies, etc.) to directly reach different elements (or nodes) on the same or other networks, or can be surrounded by a variable number of elements of the same or other networks. The reachable elements may, for example, be described by the any of a variety attributes, non-limiting examples of which will now be provided.

For example, the reachable elements may be described by network-dependent features. For example, the reachable elements may be described by local network attributes (e.g., per technology available to reach another element from a different network, such as Cloud, Backbone, Fixed Access, Mobile Access, End-User Devices, Sensors, etc.), for example including technology (e.g., DSRC, multiple DSRC, DSRC+WiFi, WiFi only, proprietary high bandwidth radio, LTE, 3.5 GHz, TV white-space, a combination of any or all of these, etc.); completely/partial/not in range, etc.). Also for example, the reachable elements may be described by storage attributes (e.g., available memory, status of the queues, etc.), computation attributes (e.g., processing capabilities, etc.), channel attributes (e.g., signal strength/quality, available channels and/or types of channels, expected interference and/or error rate per channel, etc.); and/or Status (e.g., not working because of hardware (H/W) problems, not working because of software (SW) problems, etc.); etc.

Also for example, the reachable elements may be described by vehicular/mobility-dependent features/events/behavior that may influence routing decisions. For example, the reachable elements may be described by expected contact time (e.g., derived from position, velocity, speed, travel plan, historical travel, wireless medium quality, etc.), for example amount of expected contact time, when expected contact window will open/close, etc.

Also for example, the reachable elements may be described by vehicle type (e.g., public transportation vehicle, municipal service vehicle, private enterprise vehicle, private individual vehicle, road/rail/water/air vehicle, etc.). For example, particular types of vehicles may be associated with respective levels of service. For example, a heavy vehicle may generally correspond to a relatively more noisy wireless communication environment, while a light vehicle may generally correspond to a relatively less noisy wireless environment, which may thus weight a routing decision toward a light vehicle. Additionally for example, a public bus may be associated with relatively high bandwidth available for public communication, while a private waste management company vehicle may be associated with relatively low bandwidth available for public communication.

Additionally for example, the reachable elements may be described by current and/or predicted density of neighboring nodes (e.g., vehicles or Mobile APs, Fixed APs, sensors, etc.). For example, a node operating (or predicted in the near future to be operating) in an area of high access point density may be susceptible to relatively more interference from neighboring nodes than a node operating in an area with less access point density. Also, however, depending on the node's needs (e.g., a node desiring low-bandwidth high-reliability communication), relatively high access point density may provide for higher diversity of communication pathways (or mesh options) that may be used for failover communication.

Further for example, the reachable elements may be described by expected downtimes. Such expected downtimes may, for example, include an overall percentage of time that nodes are operating or not. Such expected downtimes may also, for example, comprise absolute times at which nodes (or paths) are generally expected to be down or operating (e.g., dead zone operation, tunnel operation, high-noise environment operation, etc.).

Still further for example, the reachable elements may be described by expected crowd places. For example, it may generally be advantageous to select a node (or communication path) that does not operate in a geographical area that is (or is anticipated to be) crowded. For example, a crowded area may place high demands on limited communication bandwidth.

Yet further for example, the reachable elements may be described by in-range status (e.g., completely in-range, partially in-range, not in-range, etc.), current and/or predicted. For example, predicted in-range status may be related to expected contact time, as mentioned above. Also for example, present in-range status may be determinative when a short communication is to be performed. Partially in-range status may, however, be adequate for a short communication but may be increasingly disfavored for a longer communication.

Also for example, the reachable elements may be described as a node in zones with difficult access (e.g., derived from position or movement information, mapping information, historical performance information, etc.).

Many examples of systems and methods for communication path selection, for example centrally and/or at intermediate network nodes or end nodes of a network, are presented in U.S. Provisional Application Ser. No. 62/379,850, titled "Systems and Methods for Route Selection in a Network of Moving Things," filed on Aug. 26, 2016, which is hereby incorporated herein by reference in its entirety.

In order to provide Internet connectivity and/or to offload content from a certain network entity it is beneficial to ensure that links between different moving nodes are not saturated. For example, while deciding the best neighbor to connect to, a mobile node may consider the respective present (and/or anticipated) load of each of a plurality of neighbors. Additionally, while deciding the best neighbor to connect to, a mobile node may also consider the respective present (and/or anticipated) load of the remaining nodes on the path to the destination. Further, in order to identify the best path to a specific destination, information from different sources may be taken into consideration, for example via network message exchange with monitored and/or managed nodes.

Still further, in accordance with various aspects of the present disclosure, in order to identify the best path to a specific destination, information regarding predictions based, at least in part, on historical evaluation may also be considered. For example, there may be particular types of user sessions and/or services supported by a particular Mobile AP, which require a particular level of bandwidth and/or have strict QoS levels. In such a scenario, it may be beneficial to predict in advance the best neighbor or Fixed AP that the Mobile AP should connect to, advertising and/or enforcing that information in advance in the network.

As discussed herein, in order to optimize the global operation of a network of moving APs, for example in terms of the number, quality and length of the established connections, etc., various aspects of the present disclosure provide an algorithm fed by the input of any or all entities involved. In such an implementation, the decision made (or action taken) in some Mobile APs can influence the decision of other Mobile APs. Many non-limiting examples of context parameters that can influence (e.g., adapt) the algorithm to make the best predicted connection and/or pathway decisions are provided herein. Many non-limiting examples of such context parameters and/or the utilization thereof are also provided in U.S. Provisional Application Ser. No. 62/379,850, titled "Systems and Methods for Route Selection in a Network of Moving Things," filed on Aug. 26, 2016, which is hereby incorporated herein by reference in its entirety (e.g., expected contact time, vehicle type, current and/or predicted density of neighboring nodes, expected downtimes, expected crowd places, in-range status, nodes in zone with difficult access, etc.).

Some of such context examples include expected contact time (e.g., derived from position, velocity, speed, travel plan, historical travel, wireless medium quality, etc.), for example amount of expected contact time, when expected contact window will open/close, etc. Other contest examples include vehicle type (e.g., public transportation vehicle, municipal service vehicle, private enterprise vehicle, private individual vehicle, road/rail/water/air vehicle, etc.). For example, particular types of vehicles may be associated with respective levels of service. For example, a heavy vehicle may generally correspond to a relatively more noisy wireless communication environment, while a light vehicle may generally correspond to a relatively less noisy wireless environment, which may thus weight a routing decision toward a light vehicle. Additionally for example, a public bus may be associated with relatively high bandwidth available for public communication, while a private waste management company vehicle may be associated with relatively low bandwidth available for public communication.

Still other context examples include current and/or predicted density of neighboring nodes (e.g., vehicles or Mobile APs, Fixed APs, sensors, etc.). For example, a node operating (or predicted in the near future to be operating) in an area of high access point density may be susceptible to relatively more interference from neighboring nodes than a node operating in an area with less access point density. Also, however, depending on the node's needs (e.g., a node desiring low-bandwidth high-reliability communication), relatively high access point density may provide for higher diversity of communication pathways (or mesh options) that may be used for failover communication.

Other context examples include expected downtimes. Such expected downtimes may, for example, include an overall percentage of time that nodes are operating or not. Such expected downtimes may also, for example, comprise absolute times at which nodes (or paths) are generally expected to be down or operating (e.g., dead zone operation, tunnel operation, high-noise environment operation, etc.).

Further context examples include expected crowd places. For example, it may generally be advantageous to select a node (or communication path) that does not operate in a geographical area that is (or is anticipated to be) crowded. For example, a crowded area may place high demands on limited communication bandwidth.

Still other context examples include in-range status (e.g., completely in-range, partially in-range, not in-range, etc.), current and/or predicted. For example, predicted in-range status may be related to expected contact time, as mentioned above. Also for example, present in-range status may be determinative when a short communication is to be performed. Partially in-range status may, however, be adequate for a short communication but may be increasingly disfavored for a longer communication.

Other context examples include a node in zones with difficult access (e.g., derived from position or movement information, mapping information, historical performance information, etc.).

All the information above may, for example, be gathered by a Mobile AP from its neighborhood and/or operating environment, being then sent to the Cloud that has a global knowledge of the network. Also, some information can be derived from historic patterns (e.g., historical loading, signal strength mapping, historical handover locations, etc.) and/or provided by external sources.

Various aspects of the present disclosure comprise utilizing network shared knowledge. For example, while establishing a network connection, a node may consider various characteristics of a potential target node (e.g., current load, amount of sessions supported, links throughput and bandwidth, etc.) and for all nodes along the path to the fixed access point and beyond.

Also, various aspects of the present disclosure provide for improving the current state of the overall network and/or of individual nodes thereof. For example, historical knowledge (e.g., the usual handover location, etc.) may be brought to the network and combined with live real-time observation of resource allocation when making connection and/or routing decisions.

Additionally, various aspects of the present disclosure provide a decision algorithm that adds to environmental observation (RSSI) (e.g., as observed by a network node, etc.) global network information, for example allowing a node to make a more informed decision about which neighbor is the most suitable when the node wants to reach the Internet.

Further, various aspects of the present disclosure provide for the Cloud (e.g., a server or controller thereof) to gather all of the relevant knowledge that can influence the decision (e.g., a connection and/or routing decision) regarding a best action to take in the network in advance (e.g., predictively, etc.), which may for example provide for a better overall resource allocation, remove bottlenecks from the network, etc.

A network node (e.g., a Mobile AP, Fixed AP, etc.) may then, for example, consider the decision(s) regarding a best action to take (e.g., a best next connection and/or pathway, etc.) when making its final decision. The node may, for example, validate a recommended action (e.g., as recommended by a Cloud server, central controller, upstream node, etc.) based on the present real-time context of the node, which the node may have acquired from measuring its operating environment, from information received from neighboring nodes, etc.

In an example implementation, the information/advertisements sent by the Cloud to the node may, for example, be considered predicted connection vectors, which the node (or nodes) is to validate before implementing (or enforcing) the predicted connection vectors in the network.

Additionally, the comparison between the predicted and implemented decisions taken in the network can be later analyzed (e.g., by the Cloud server, central controller, etc.) in order to improve the selection algorithms that made the decisions (e.g., regarding recommended connections, pathways, etc.) in advance. Such operation may, for example, help to prevent or inhibit a network node from reaching a critical state of saturation/overload.

The ability of the Cloud to enforce some decision in the network is also useful for improving the processing being performed in the Cloud, as the resources/services can be established before the individual node(s) take the actions in the network.

In various example implementations a Mobile AP may want to establish a network connection with a static access point, directly or through other mobile access points leveraging on multi-hop communication capabilities. In various example implementations, primary goals of the Mobile AP may also be to efficiently balance user sessions, balance traffic consumption over the network, balance the bandwidth assigned to each link, avoid link bottlenecks, enrich environmental observation, etc.

In an example implementation, an overall connection (or routing) solution may comprise predicting (e.g., based on historical node and/or communication pathway behavior, based on overall knowledge of the communication network's operational status, based on reports received from the network nodes, based on requested bandwidths, etc.) the best available neighbor to which a node (e.g., a Mobile AP, etc.) is to connect, evaluating communication pathways to/from the intended destination, aiming to meet a shared goal by performing decisions that will have a global impact in the overall network (e.g., not only in the nodes/locations where the decisions are ultimately implemented). Such an implementation is advantageous for numerous reasons. For example there may be other nodes nearby that are presently contending for the same resources as well as other nodes that will be contending for the same resources (e.g., Mobile APs that are moving toward those locations, etc.).

In an example implementation, the Cloud (e.g., a server thereof, a central controller, etc.) may monitor (e.g., periodically, always, in response to various network events or conditions, etc.) the behavior of network nodes and deliver (e.g., communicating via control messaging, etc.) connection vectors and/or state predictions to the affected (or potentially affected) network nodes. A connection vector may, for example, include information indicating a predicted next best next-hop (e.g., a recommendation for an alternative connection, etc.), bandwidth and duration of the predicted or recommended connection that a specific node should take, etc. State predictions may, for example, include the conditions (e.g., network characteristics, signal characteristics, location information, bandwidth availability, connection latency or speed, overall communication pathway details, services provided by various nodes, services being utilized by other users connected to the predicted connection node, loading characteristics, any of the context characteristics discussed herein, etc.) on which the predicted next best connection vector was based, including for example assumed conditions, monitored but potentially outdated network information, etc. The one or more nodes ultimately implementing the recommended connection may thus be able to verify such conditions or characteristics based on real-time detected conditions, for example to ascertain whether the predicted connection vector was based on an accurate view of the current state of the network.

Various aspects of the present disclosure thus comprise systems and methods for performing network monitoring. For example, any of a variety of network aspects may be monitored, many examples of which are provided herein (e.g., handovers performed, number of hops and/or number of hops including mobile nodes, number of sessions (and/or types thereof) and/or users per node, node location and/or trajectory and/or route, services access per node, etc. Node density (e.g., of Fixed APs, Mobile APs, etc.) may also be monitored. Additionally, any of the example context parameters discussed herein may be monitored.

Figure 7:
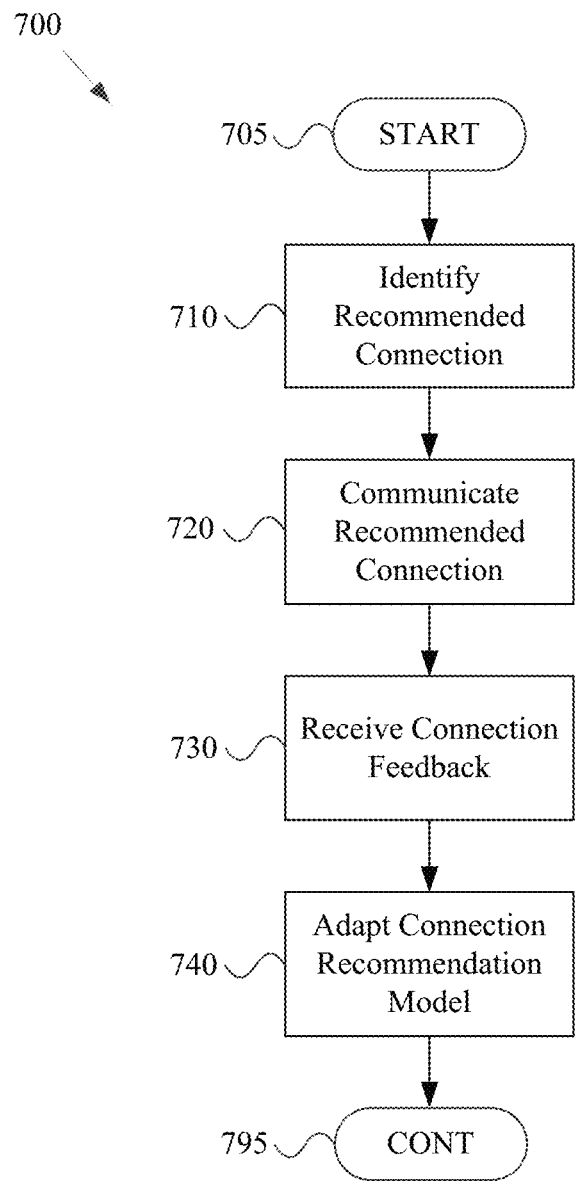
FIG. 7 shows a flow diagram of an example method of communication path selection, in accordance with various aspects of the present disclosure.

In accordance with various aspects of the present disclosure, an example method is provided that includes, identifying a recommended connection, communicating information of the recommended connection, receiving feedback regarding the recommended connection, and adapting the connection recommendation model. In particular, FIG. 7 shows a flow diagram of an example method 700 of communication path (or connection) selection, in accordance with various aspects of the present disclosure. The example method 700 may, for example, share any or all characteristics with the other example methods, nodes, networks and/or network components 100, 200, 300, 400, 500-570, 600, 800, 900, and 1000, discussed herein.

The example method 700 may, for example, be implemented in a Cloud server (or a plurality thereof in a distributed manner). The example method 700 may also, for example, be implemented in any of a variety of network nodes (e.g., a network controller, a central controller, access point, etc.), for example in a singular or distributed manner.

The example method 700 may begin executing at block 705. The example method 700 may begin executing in response to any or a variety of causes or conditions, non-limiting examples of which are provided herein. For example, the example method 700 may execute continuously (e.g., in response to a power-up or reset condition at the node(s) implementing the method 700, in response to execution of an application implementing the method 700 or a portion thereof, in response to a message received from a node (or user thereof) desiring to join the network or change network connections, in response to a message from a network node that is overloaded or operating close to capacity, etc. Also for example, block 705 of the example method 700 may receive execution flow from any other block of the example method 700 (or a portion thereof). Additionally for example, block 705 may receive execution flow from any block (or a portion thereof) of the example method 900 or any other method disclosed herein. In general, the example method 700 may begin executing in response to any or a variety of causes or conditions. Accordingly, the scope of this disclosure should not be limited by characteristics of any particular cause or condition.

The example method 700 may, at block 710, comprise identifying a predicted (or recommended) connection (and/or communication pathway) (and/or network state or status). Block 710 may comprise identifying the predicted connection in any of a variety of manners, many non-limiting examples of which are provided herein.

For example, many non-limiting examples of such predicting (or determining) are provided in U.S. Provisional Application Ser. No. 62/379,850, titled "Systems and Methods for Route Selection in a Network of Moving Things," filed on Aug. 26, 2016, the contents of which are hereby incorporated herein by reference in their entirety. Block 710 may, for example, comprise determining an optimized (or predicted optimized) set of connections for the network of moving things. As discussed herein, block 710 may comprise predicting such connections based on an optimization model comprising any of a variety of parameters (e.g., communication network parameters, node context parameters, etc.).

Figure 8:
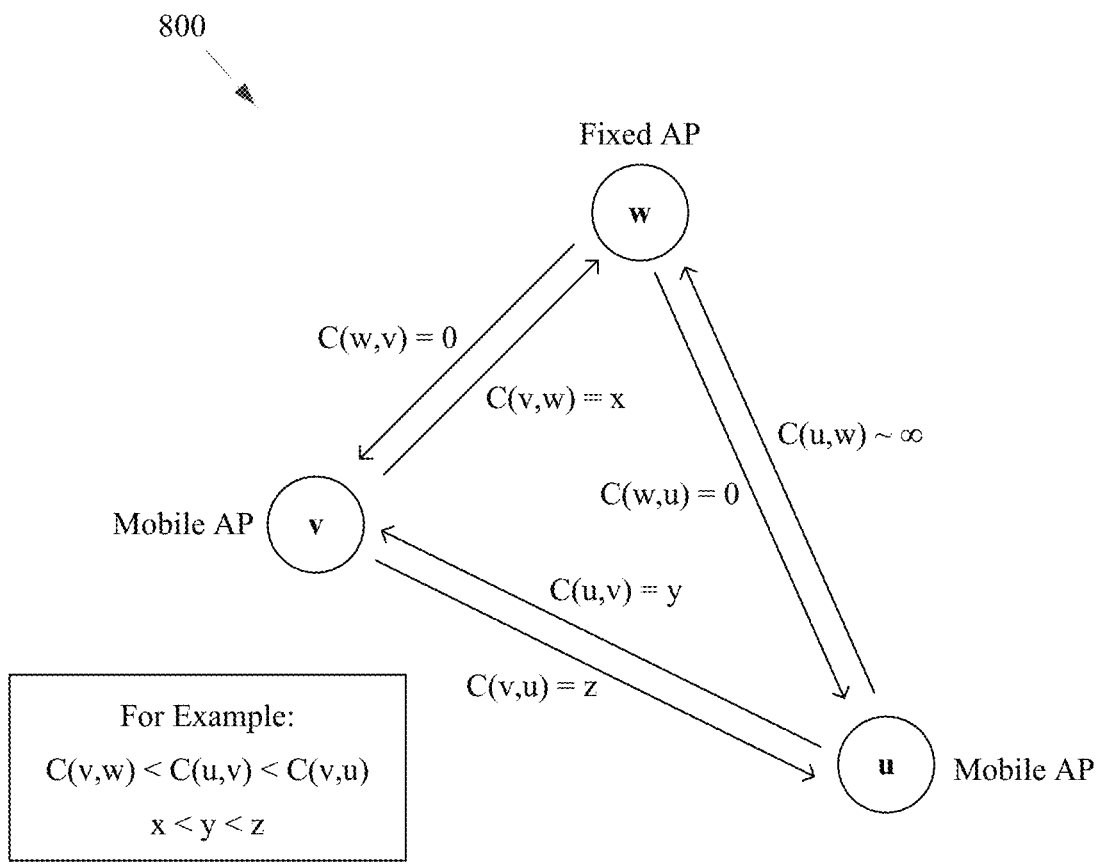
FIG. 8 shows an example communication path selection scenario, in accordance with various aspects of the present disclosure.

Such an optimization model may, for example, be based at least in part on optimizing an overall communication network cost function, which may also include selecting a connection (or communication pathway) for a node that results in the lowest cost. Such a cost function may include any one or more of the communication network parameters discussed herein. FIG. 8 provides an illustrative example of connection selection based on such optimization. In particular, FIG. 8 shows an example communication path selection scenario 800, in accordance with various aspects of the present disclosure.

Referring temporarily to FIG. 8, the example prediction model may, for example, be based upon a directed graph where each link has a certain capacity or cost ("C"). Each Mobile AP represented in the graph, is shown with a respective communication link (e.g., (u,v), (v,u), (u,w), (w,u), (v,w), (w,v)) with each of its current neighbor nodes (other Mobile APs, Fixed APs, etc.). A neighbor mode may generally, for example, be a physically (or communicatively) accessible node considering technological and environmental limitations and, in order to identify a neighbor node, both the distance and the connection likelihood, over time, may be taken into consideration (among other things).

The function C(u,v) characterizes the cost of node u connected to node v (e.g., associated with node u communicating information to node v, and the function C(v,u) characterizes the reverse connection (e.g., associated with node v communicating information to node u). Since, in the example scenario, just Mobile APs connect to Fixed APs, and not the other way around, C(u,v)=0 when node u is a Fixed AP. Note that the scope of this disclosure, however, is not limited by such characteristics of the example scenario, which is presented herein for clarity of illustration.

In the example scenario, the Mobile AP, node u, has a goal to establish a path to the Fixed AP, node w. One such path is the path u ↝ v ↝ w to the Fixed AP (or static AP), node w. As shown in the example diagram 800, the path may be a direct path from the Mobile AP, node u, to the Fixed AP, node w, in a single-hop connection, and may also pass through the Mobile AP, node v, in a multi-hop connection to the Fixed AP, node w.

The cost function C(u,v) may, for example, comprise a weighted product (or sum of weighted products) that includes any one or more of the network operation parameters and/or context parameters discussed herein, for example real time network information and/or most recently reported network information (e.g., number of hops to the Fixed AP, node w, number of sessions being handled by node u and node v, traffic generated in node u and node v, location, trajectory, signal strength, etc.), historical data (e.g., estimated connection duration in different path hops, historical node loading, historical handoff performance, historical signal strength and/or quality issues, etc.), etc.

Note that the vehicle trajectory information (or route) information for a vehicle (or all vehicles considered by the connectivity determination) may be obtained from the vehicle and/or navigation system thereof. For example in an implementation in which actual and/or planned vehicle route information is considered when making a connection decision, such information may be obtained from a manually-operated navigation system of the vehicle, from an autonomous vehicle control or guidance system, from an end user device running a navigation application, from a central traffic controller, etc.

In an example implementation, the connectivity determination may be based, at least in part, on a planned route for an autonomous vehicle (e.g., presented as vehicle location as a function of absolute and/or relative time, presented as relative position between vehicle(s) and/or AP(s) as a function of absolute and/or relative time, etc.). The planned route may, for example, indicate streets, intersections, planned stops and starts (e.g., to pick up or drop off passengers or cargo, fuel stops, bus stops, etc., which may for example all be presented as functions of time. As the example autonomous vehicle implements the planned route, any deviations from the planned route (e.g., due to road obstructions, due to fuel concerns, due to vehicle faults, due to emergency context conditions.

In the example scenario 800 shown in FIG. 8, the Mobile AP, node u, desires to reach the Fixed AP, node w. Since the cost for node u to connect with node w directly is relatively high (e.g., trending to infinity or other relatively large cost number), the system (e.g., a Cloud server, central controller, etc.) advises the Mobile AP, node u, to establish a connection with the Fixed AP, node w, indirectly through the Mobile AP, node v. For example, the sum of the respective costs of the connection from the Mobile AP, node u, to the Mobile AP, node v, and from the Mobile AP, node v, to the Fixed AP, node w, is substantially less than the cost of the connection from the Mobile AP, node u, directly to the Fixed AP, node w.

Referring back to FIG. 7, the example method 700 may, at block 720, comprise communicating information of the predicted (or recommended) connection (or communication pathway) and/or information regarding various parameters on which the prediction was based.

Block 720 may comprise performing such communicating in any of a variety of manners, non-limiting examples of which are provided herein. For example, block 720 may comprise communicating the information (e.g., including information regarding the recommended connection, information regarding any or all of the parameters on which selection of the recommended connection was based, etc.).

Block 720 may, for example, comprise communicating the information to the node performing (or initiating) the connection, to any node involved in the recommended connection (or communication pathway), to any node that may potentially be involved in a connection (e.g., in the recommended connection or pathway and/or in alternative connections or pathways that may be formed, etc.). The communication may, for example, be performed asynchronously. For example, a Cloud server (or central controller, etc.) may determine to recommend a connection (or pathway) without being solicited for such a recommendation by a node (e.g., as part of an overall network management scheme, etc.). For example, a Cloud server (or central controller, etc.) may determine that a node handover is imminent, may determine that load shifting is desired for overall traffic balancing purposes, etc.). Also for example, a Cloud server (or central controller, etc.) may determine to recommend a connection (or pathway) in response to solicitation by a node for a recommended connection (or pathway). In any case, timely communication of such connection (or communication pathway) information to the node(s) ultimately implementing the connection (or communication pathway) is desirable.

In general, block 720 may comprise communicating information of the predicted (or recommended) connection (or communication pathway) and/or information regarding various parameters on which the prediction was based. Accordingly, the scope of this disclosure should not be limited by characteristics of any particular manner of performing such communicating or by characteristics of any particular type of information communicated.

The example method 700 may, at block 730, comprise receiving connection feedback. Block 730 may comprise receiving the connection feedback in any of a variety of manners, non-limiting examples of which are provided herein.

Figure 9:
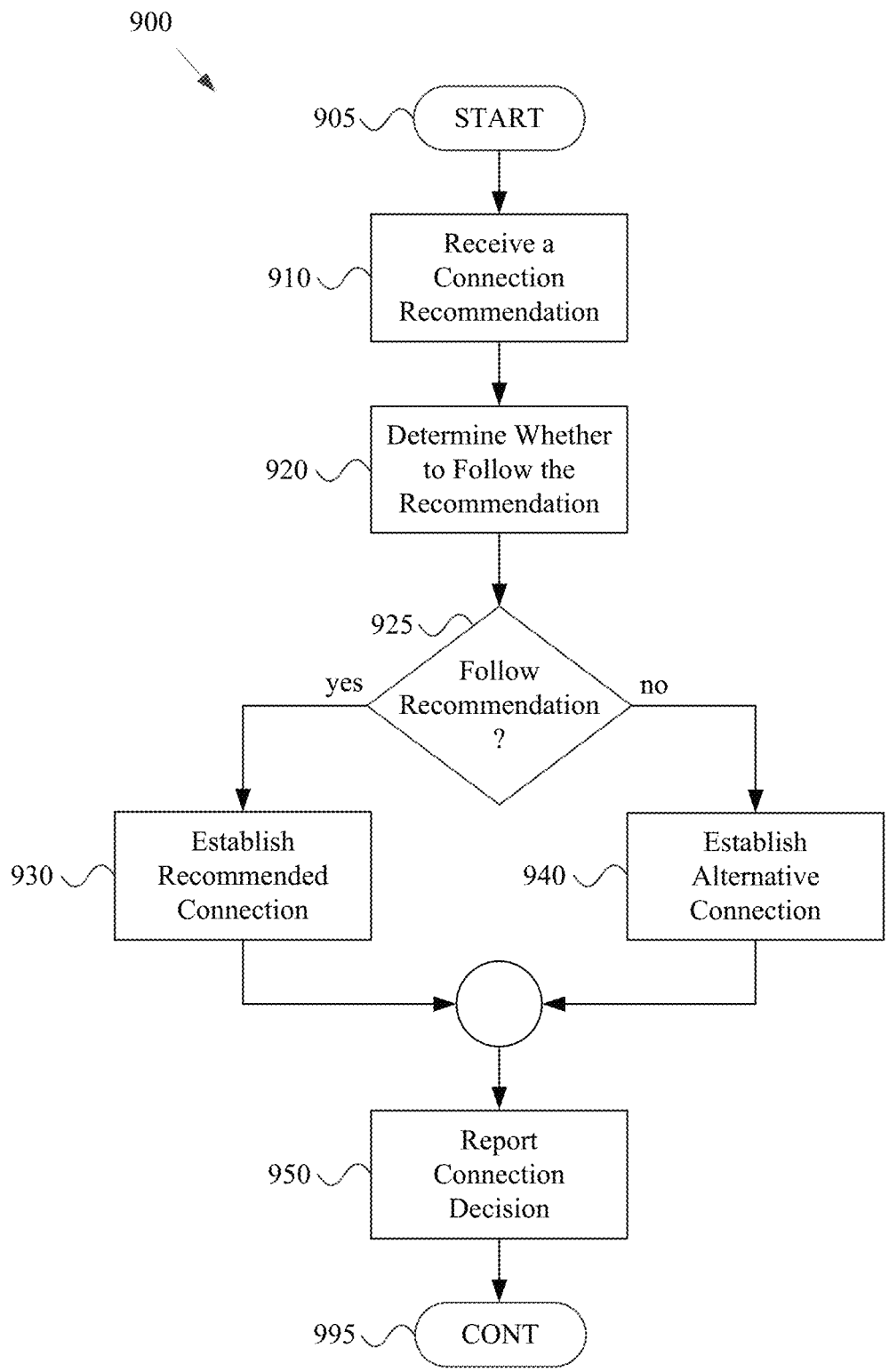
FIG. 9 shows a flow diagram of an example method of communication path selection, in accordance with various aspects of the present disclosure.

As discussed herein, for example with regard to the example method 900 of FIG. 9 and elsewhere, a node may implement the connection recommendation (or communication pathway), or the node may instead implement an alternative connection (or communication pathway).

In an example scenario in which one or more nodes implemented the connection recommended at block 720, block 730 may comprise receiving information from the node and/or other nodes involved in the connection (or communication pathway) indicating that the connection has been implemented. For example, block 730 may comprise receiving information from a node verifying the various parameters on which the recommendation was based, and may for example also indicate instances in which the parameters may be different than understood (or assumed) by the Cloud server (or central controller) making the recommendation. For example, as explained herein, a node may follow the recommendation even when one or more of the decision parameters, as understood by the node, are different than those understood by the Cloud server (or central controller). As a non-limiting example, in a scenario in which the recommendation was based on loading of an adjacent node that turns out to be different than understood by the Cloud server (or central controller), so long as such loading is not critically different than expected (e.g., the loading is within a threshold tolerance range), the node may still perform the recommended connection, but may inform the Cloud server of the difference between the expected parameter and the actual parameter as determined by the node.

In an example scenario in which the recommended connection is not implemented, for example due to a significant misunderstanding in one or more parameters on which the recommendation was based, based on one or more parameters that might not even be considered by the Cloud server (or central controller), etc., the node may determine to deviate from the recommended connection and perform a different connection. For example, the node may determine that the loading of a node to which the node has been recommended to connect is significantly greater than that understood by the Cloud server (or central controller) making the recommendation and is for example so high that the node determines to override the recommendation, the node may report back to the Cloud server that the node did not follow the connection recommendation and indicate the reason(s) why the node decided to deviate from the recommendation. For example, the node may communicate information of the loading of the neighbor node, information of an emergency condition or other condition unknown to the Cloud server (or central controller, etc.), information of an unexpectedly encountered signal interference, information of an unexpected deviation from a travel route, information of a local power supply condition at the node, etc.

Additionally, for example, block 730 may comprise receiving real-time information from the node corresponding to all parameters on which the recommendation was based. For example, in a scenario in which the loading recommendation was based on respective node load, signal strength, position, and signal-to-noise ratio, the node(s) (e.g., whether or not the recommendation was followed) may report back to the Cloud server (or central controller) regarding the measured or real-time values of any or all of the parameters (e.g., as understood by the node(s)).

In general, block 730 may comprise receiving information from any or all nodes involved in setting up a predicted (or recommended) connection. Accordingly, the scope of this disclosure should not be limited by characteristics of any particular manner of receiving such information or by characteristics of any particular type of received information.

The example method 700 may, at block 740, comprise adapting (or modifying) the decision model utilized (e.g., at block 710) to identify the predicted (or recommended) connection (or communication pathway). Such adaptation may, for example, comprise adjusting parameter values utilized in the decision model, adjusting the weighting of parameter values, adding and/or eliminating parameters from the model, etc.

In an example implementation, block 740 may comprise removing a parameter from the model if it is determined that the parameter is regularly misunderstood and/or particular difficult to track. In an example implementation, block 740 may comprise adding a parameter to the model if it is determined that nodes regularly deviate from a connection recommendation based on a parameter that is not part of the decision model. In an example implementation, block 740 may comprise reducing a weighting factor associated with a particularly unreliable (or regularly incorrectly estimated) parameter.

The modification of various parameters, parameter weighting, additional and/or removal of parameters from the model (e.g., cost model, etc.) may then, for example, be followed by recalculation or re-analysis of the model. For example, link cost may be recalculated based on updated parameter information, modification of the cost equation, etc. In various scenarios, such model adaptation and/or recalculation may be continual, may be performed periodically on a timed schedule, may be performed whenever updated parameter information is received, may be performed in response to a detected network condition (e.g., a node reporting a critical amount of loading or expected loading, detection of dropped connections, etc.), etc.

Such model adaptation and/or recalculation may, for example, result in a recommended modification to a connection that is not directly related to a connection just recommended and/or implemented. For example, information from a first node concerning its environment may, when considered in the overall model, change the recommended connection for a second node that is not connected to the first node (e.g., not directly connected and/or not indirectly connected).

In general, block 740 may comprise adapting (or modifying) the decision model utilized to identify the predicted (or recommended) connection(s) (or communication pathway(s)). Accordingly, the scope of this disclosure should not be limited by characteristics of any particular manner of adapting the decision model.

The example method 700 may, at block 795, comprise continuing operation. Block 795 may comprise performing such continued operation in any of a variety of manners, non-limiting examples of which are provided herein.

For example, block 795 may comprise returning execution flow to any block of the example method 700 or any portion thereof. Also for example, block 795 may comprise directing execution flow to any block of the example method 900 or any portion thereof. Additionally for example, block 795 may comprise directing execution flow to any method step (or any portion thereof) discussed herein.

Block 795 may, for example, comprise continuing to monitor any or all of the network operational aspects discussed herein (e.g., periodically, asynchronously, synchronously, passively receiving status information, actively soliciting status information, etc.), for example to determine whether a different connection should be recommended.

In general, block 795 may comprise performing continued operation. Accordingly, the scope of this disclosure should not be limited by characteristics of any particular type of continued operation.

In an example scenario, a node (e.g., a Mobile AP, etc.) may be (or desire to be) providing Internet access to end users. During authentication of the node (and/or one or more users thereof), a connection with a Cloud server (or central controller) may be established. At this point, the Cloud server may become aware of the existence (and/or communication needs) of the node and/or of the user(s) thereof, and/or the Cloud server may become aware of different requirements for the node and/or of the user(s) thereof. The Cloud server (or central controller) may then, for example, merge various factors (e.g., location awareness, user traffic consumption estimates, etc.) and communicate to the node regarding the best neighbor nodes for handling the needs of the node (and/or users thereof). If the Cloud server detects (e.g., based on messages from the nodes of the network, based on user input, etc.) that the network conditions have changed, the Cloud server may then push a new set of connection recommendations to the nodes of the network. In other words, the Cloud server may disseminate a set of connection recommendations that include node handovers, even in a scenario in which none of the nodes are contemplating a present handover.

As presented in the discussion of FIG. 7, a Cloud server (or central controller or network controller, or other network node, etc.) may monitor overall network state and/or operational history of the network, provide network connection (or communication pathway) recommendations, receive information regarding network operation (e.g., from the nodes of the network, etc.) and adapt the optimization model utilized to determine network connection recommendations as knowledge of the network is gained. In accordance with various aspects of the present disclosure, a network node may receive the connection (or communication pathway) recommendation and base operation on such recommendation. A non-limiting example of such node operation is provided at FIG. 9.

In particular, FIG. 9 shows a flow diagram of an example method of communication path selection, in accordance with various aspects of the present disclosure. The example method 900 may, for example, share any or all characteristics with the other example methods, nodes, networks and/or network components 100, 200, 300, 400, 500-570, 600, 700, 800, and 1000, discussed herein. The example method 900 may, for example, be implemented in a Mobile AP and/or in other network nodes involved in implementing a network connection (e.g., other Mobile APs, Fixed APs, network controllers, etc.).

The example method 900 may begin executing at block 905. The example method 900 may begin executing in response to any or a variety of causes or conditions, non-limiting examples of which are provided herein. For example, the example method 900 may execute continuously (e.g., in response to a power-up or reset condition at the node(s) implementing the method 900, in response to execution of an application implementing the method 900 or a portion thereof, in response to a message received from a user of the node desiring to utilize the node, etc. Also for example, block 905 of the example method 900 may receive execution flow from any other block of the example method 900 (or a portion thereof). Additionally for example, block 905 may receive execution flow from any block (or a portion thereof) of the example method 700 or any other method disclosed herein. In general, the example method 900 may begin execution in response to any or a variety of causes or conditions. Accordingly, the scope of this disclosure should not be limited by characteristics of any particular cause or condition.

The example method 900 may, at block 910, comprise receiving a connection recommendation. Block 910 may comprise performing such receiving in any of a variety of manners, non-limiting examples of which are provided herein.

Block 910 may comprise receiving a connection (or communication pathway) recommendation from any of a variety of sources. For example, block 910 may comprise receiving a connection (or communication pathway) from a node (or entity) operating in accordance with the example method 700 of FIG. 7 (e.g., block 720, etc.). For example, block 910 may comprise receiving the connection recommendation from a Cloud server (or central controller, etc.). Also for example, block 910 may comprise receiving the recommendation from any other node of the network (e.g., a network controller, Fixed AP, Mobile AP, etc.). Block 910 may comprise receiving the recommendation via any of a variety of communication media. For example, block 910 may comprise receiving the recommendation via the network to which a connection is to be established or modified (e.g., via a vehicle network or network of moving things, etc.). Also for example, block 910 may comprise receiving the recommendation via a cellular network, satellite network, etc.).

As discussed herein, the connection (or communication pathway) recommendation may comprise any of a variety of types of information. For example, the connection recommendation may comprise information identifying the recommendation and any or all information needed to implement the connection (e.g., protocol information, address information, channel information, secure access information, encryption information, end-to-end pathway information, connection constraints or limits, etc.). Also for example, the connection recommendation may comprise information describing the parameters that were utilized to determine the recommended connection, many examples of which are provided herein (e.g., node loading information, location information, trajectory information, bandwidth availability information, signal strength (e.g., RSSI, etc.) and/or quality (e.g., S/N, etc.) information, etc.).

In general, block 910 may comprise receiving a connection recommendation. Accordingly, the scope of this disclosure should not be limited by characteristics of any particular manner of receiving a connection recommendation or by characteristics of any particular type of connection recommendation.

The example method 900 may, at block 920, comprise determining whether to follow the received recommendation (e.g., at received at block 910, etc.), for example establishing the connection as recommended. Block 910 may comprise performing such determining in any of a variety of manners, non-limiting examples of which are provided herein.

As discussed herein (e.g., with regard to the example method 700 of FIG. 7, etc.), the recommended connection may have been determined by considering any of a variety of parameters (e.g., processing cost functions for individual links, for the overall network, anticipated and/or real-time vehicle context parameters, etc.). At block 920, the node(s) involved in the recommended connection (or communication pathway) may consider some or all of the same parameters. For example, the node may have a respective real-time understanding of the parameters that is more accurate in real-time than the understanding of the parameters utilized by the Cloud server (or other node) that determined the recommended connection. For example, the Cloud server may have determined the recommended connection utilizing historical and/or planned and/or anticipated parameters (e.g., connection parameters, loading parameters, location parameters, vehicle route parameters, etc.) that may or may not still be valid. The node, at part of block 920, may thus for example validate the parameters utilized by the Cloud server in making its recommended connection determination. For example, the node may validate its loading and/or bandwidth requirements, the loading of candidate nodes (including the recommended node) for the connection, location information, signal strength characteristics, trajectory information (e.g., of the vehicle implementing the connection, of other vehicles, etc.), weather information, crowd size information, etc.

In an example implementation, each of one or more of the parameters utilized for the recommended connection determination may correspond to a respective tolerance range (or threshold). Block 920 may then comprise determining whether the real-time parameters are within an acceptance range of the parameters considered by the Cloud server (or other node). For example, if a key determining factor in the determination of the recommended connection is expected signal strength, the signal strength parameter may have a tolerance range beyond which the node is allowed to discard the recommended connection in favor of its autonomously-determined best connection. Also for example, in a scenario in which a recommended connection to another node is based on that other node's low loading, but the node determines in real-time that the other node's low loading is actually at or near maximum capacity, the node may be authorized to discard the recommended connection in favor of its own determined best connection. In another example scenario in which a recommended connection time is based on an expected time within range of another node (e.g., based on node location and/or trajectory, etc.), but the real-time determination of the expected time within range of the other node is substantially less (e.g., out of the tolerance range), then the node may be authorized to discard the recommended connection if favor of its own determined best connection. In still another example scenario in which a recommended connection determination is based, at least in part, on planned vehicle trajectory (e.g., of an autonomous vehicle, of a locally manually controlled vehicle, of a remotely controlled vehicle, etc.) and the implemented trajectory is commanded to deviate or determines to deviate or actually deviates from the planned vehicle trajectory, then the node may be authorized to autonomously discard the recommended connection in favor of its own determined best connection (e.g., at least until receiving further instructions from a central controller).

Note that in various implementations, the so-called recommendation may also be a directive from which the node is not allowed to deviate. In other words, there may be instances (e.g., public emergency situations, network failover situations, etc.) in which the Cloud server (or other node) making the recommendation determines that the recommendation is in fact a directive. For example, the Cloud server may realize that the recommended connection is not the best connection from the perspective of the node, but the overall network situation demands that the node cannot use its perceived best connection. In such a scenario, the Cloud server (or other node) may specify that the connection recommendation is in fact a directive.

In various example scenarios, a node (or node to which the node is to connect) may change speed or trajectory (e.g., in real-time in response to an accident or other traffic issue). Also for example, one or more users may unexpectedly leave a vehicle carrying the node or a target node for the connection, drastically changing the loading relative to the loading utilized to determine the recommended connection. Also for example, the location of the node (or node to which the node is to connect) may be different from that utilized by the Cloud server to determine the recommended connection (e.g., due to positioning errors, GPS issues, etc.). The node may obtain information of any of the parameters discussed herein through its own measurement and/or from other nodes by sharing context information.

In an example implementation, the node may implement the same (or similar) selection criteria as that utilized by the Cloud server (or other node) in determining whether to follow the recommendation. For example, the node may process the unexpected parameter value(s) in an equation similar to the one utilized by the Cloud server to ascertain whether the unexpected parameter value(s) significantly change the recommended connection. In other words, even if one or more parameters are not as expected, the recommended connection may continue to be the best. For example, accidents, road obstructions, unexpected location, and other factors (e.g., critical context changes) may substantially impact the connection determination, while minor deviations (e.g., relatively minor differences in signal strength, bus loading, vehicle speed, etc.) may result in implementation (or enforcement) of the recommended connection.

The node may additionally determine whether to follow the recommendation based on information that the received recommendation was not based on. For example, the node may have real-time access to emergency information, vehicle information, user loading information, power supply information, etc. that was not considered during the determination of the recommended connection. The node may thus (e.g., under various authorized conditions) analyze such information when determining whether to implement the recommended connection. For example, a node may determine that an emergency situation warrants connecting with a cellular network instead of a node recommended by a Cloud server. Also for example, a node may determine that an emergency situation warrants connecting with a plurality of nodes simultaneously for reliable redundant communication. Additionally for example, a node may identify a node that is not considered by the network (e.g., because of the node being at an unexpected location, because of the node being new, etc.), and determine that the identified node is significantly better than the recommended node (e.g., by at least a threshold amount) and thus deviate from the recommended connection. Further for example, a node may unexpectedly encounter a user that requires a level of security that is not provided by the recommended connection, and autonomously determine to establish a connection different from the recommended connection. Still further for example, a node may consider the presence of an interference source that is unknown to the Cloud server that determined the recommended connection. Also for example, a node may attempt to implement the recommended connection and fail, and thus determine to implement an alternative connection. Additionally for example, a node may determine that it (or a connection target node) is not at the location utilized by the Cloud server (or other node) in determining the recommended connection, and thus determine to implement an alternative connection.

Note that block 920 may, time permitting, also comprise negotiations between the node(s) involved in a recommended connection and the Cloud server (or other node) recommending the connection. For example, a node (time permitting) may request permission from the Cloud server for deviating from the recommended connection, for example providing information causing the node to request the deviation. The Cloud server may then affirm or deny the requested deviation.

In general, since the Cloud server (or other node) that determines the recommended connection may have access to information (e.g., overall network traffic information, overall node location information, historical connection information, etc.), the recommended connection may be treated as a preferred connection by the node. For example, a node may need a substantial reason to deviate from the recommended connection.

In general, block 920 may comprise determining whether to follow the received recommendation. Accordingly, the scope of the present disclosure should not be limited by characteristics of any particular manner of determining whether to follow the received recommendation.

The example method 900 may, at block 925, comprise directing execution flow of the example method 900. Block 925 may, for example if it is determined to follow the recommendation received at block 910, direct execution flow of the example method 900 to block 930 to implement the recommended connection (or communication pathway). Also for example, block 925 may, for example if it is determined to implement an alternative connection (or communication pathway) different from the recommended connection, direct execution flow of the example method 900 to block 940 to implement an alternative connection (or communication pathway).

After implementing a connection (e.g., a recommended connection at block 930 or an alternative connection at block 940), execution flow of the example method 900 proceeds to block 950, at which the one or more nodes that implement a connection may communicate information of the connection (e.g., back to the source of the recommendation received at block 910).

Block 950 may comprise performing such reporting in any of a variety of manners, non-limiting examples of which are provided herein. For example, in a scenario in which the recommended connection is established at block 930, block 950 may comprise notifying the source of the recommendation that the recommended connection was established. As discussed herein, the connection recommendation may comprise information describing the network or node context parameters analyzed to determine the recommended connection. In such an implementation, the notification provided at block 950 may comprise information of such network or node context parameters (e.g., as measured, understood, etc., by the node implementing the connection).

Also for example, in a scenario in which an alternative connection is established at block 940 instead of the recommended connection, block 950 may comprise notifying the source of the recommendation that the alternative connection was established. As discussed herein, the connection recommendation may comprise information describing the network or node context parameters analyzed to determine the recommended connection. In such an implementation, the notification provided at block 950 may comprise information of such network or node context parameters (e.g., as measured, understood, etc., by the node implementing the connection). The notification may also, for example, include any other information explaining why the node deviated from the recommended connection (e.g., parameters that were not considered in determining the recommendation, a code to identify one of a plurality of exceptions that the node is allowed to make in not following the recommendation, etc.). For example, in an example scenario in which a node deviated from the recommended connection based at least in part on a difference between an actual route of a vehicle (e.g., an autonomous vehicle, a vehicle carrying the node, a vehicle carrying another node, etc.) and a planned or predicted route of such vehicle, the notification provided at block 950 may comprise information regarding the route difference.

In general, block 950 may comprise reporting information regarding its network connection decision (e.g., back to a source of the connection recommendation). Accordingly, the scope of the present disclosure should not be limited by characteristics of any particular manner of performing such reporting, or by characteristics of any particular type of report.

The example method 900 may, at block 995, comprise continuing operation. Block 995 may comprise performing such continued operation in any of a variety of manners, non-limiting examples of which are provided herein.

For example, block 995 may comprise returning execution flow to any block of the example method 900 or any portion thereof. Also for example, block 995 may comprise directing execution flow to any block of the example method 700 or any portion thereof. Additionally for example, block 995 may comprise directing execution flow to any method step (or any portion thereof) discussed herein.

Block 995 may, for example, comprise continuing to monitor any or all of the network operational aspects discussed herein (e.g., periodically, asynchronously, synchronously, passively receiving status information, actively soliciting status information, etc.), for example to determine whether a different connection should be implemented.

Block 995 may also, for example, comprise performing additional communication with the Cloud server (or other node) that determined the recommended connection. For example, the Cloud server, having determined that the node did not implement the recommended connection, may solicit more information from the node regarding the node's real-time perspective or understanding of the network and/or node context. The node may, for example in response to such solicitation, perform additional parameter testing, interact with other nodes regarding their respective loading conditions, obtain location information, etc., and provide such information back to the Cloud server.

In general, block 995 may comprise performing continued operation. Accordingly, the scope of this disclosure should not be limited by characteristics of any particular type of continued operation.

Figure 10:
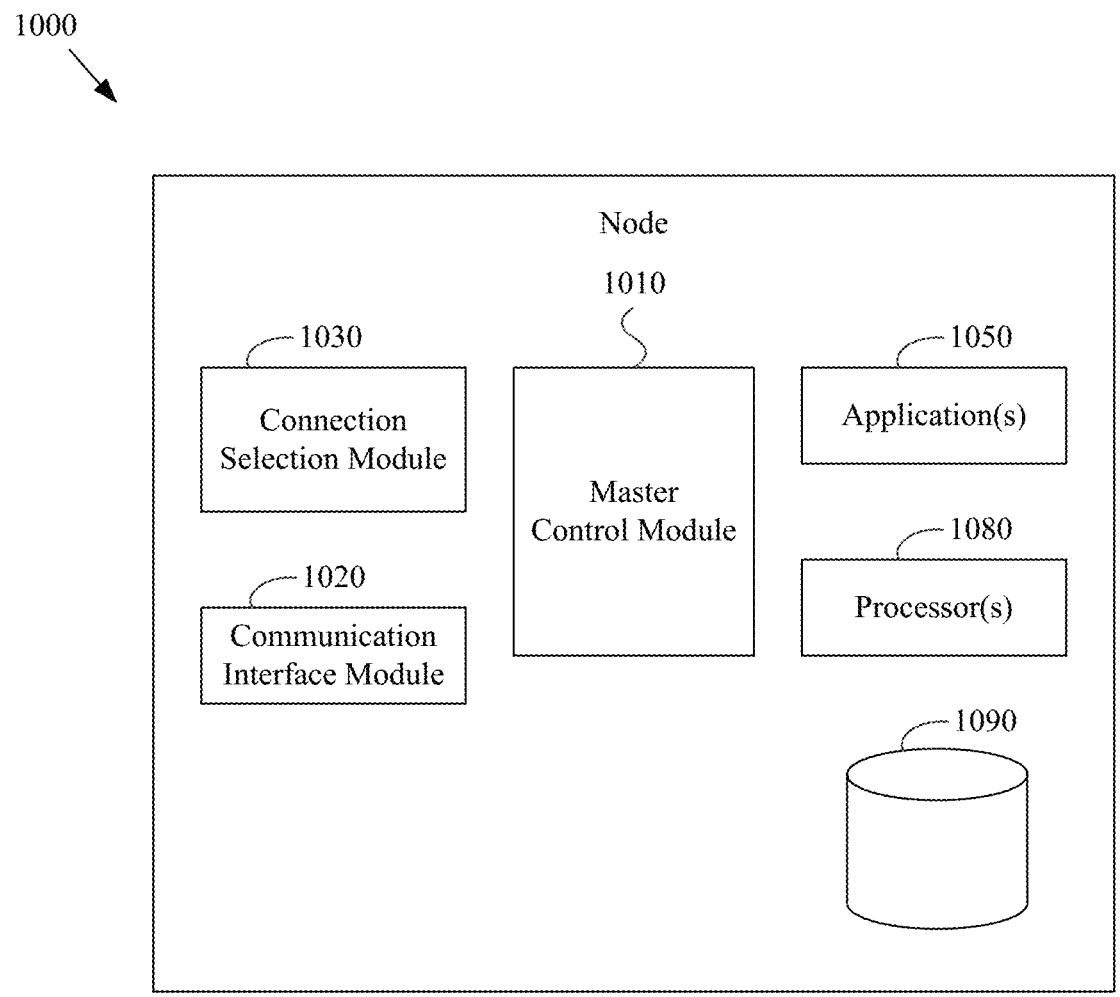
FIG. 10 shows an example system for communication path selection, in accordance with various aspects of the present disclosure.

FIG. 10 shows a block diagram of an example network node (e.g., a MAP, a FAP, an NC, a Central Network Controller, a Cloud server or computing system, etc.), in accordance with various aspects of the present disclosure. The example node 1000 may, for example, share any or all characteristics with the other example methods, nodes, networks, and/or network components 100-900, discussed herein. For example, any or all of the components of the example node 1000 may perform any or all of the method steps presented herein (e.g., with regard to the example method 700 of FIG. 7, the example method 900 of FIG. 9, etc.), for example with regard to a Cloud server (or central controller), Mobile AP, Fixed AP, Network Controller, any combination thereof, etc.

The example node 1000 may, for example, comprise a Communication Interface Module 1020 that operates to perform any or all of the wireless and/or wired communication functionality for the node 1000, many examples of which are provided herein (e.g., communication with Cloud databases, communication with NCs, communication with Fixed AP nodes, communication with Mobile AP nodes, communication directly with client devices, backhaul or cellular communication, etc.). The Communication I/F Module 1020 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc.

The example node 1000 also comprises a Path Selection/Optimization Module 1030 that, for example, operates to perform any or all of the path selection and/or optimization functionality (e.g., feature information generation or communication, path decision making, path cost determining, recommended connection or path determination, etc.) discussed herein (e.g., with regard to the example methods 700 and 900 of FIGS. 7 and 9, etc.). The Path Selection/Optimization Module 1030 may, for example, utilize communication services provided by the Communication Interface Module 1020 to perform various aspects of communication.

The example node 1000 may, for example, comprise a Master Control Module 1010 that generally manages operation of the node 1000 at a high level. Such Master Control Module 1010 may, for example, comprise various aspects of an operating system for the node 1000.

The example node 1000 may further, for example, comprise one or more Applications 1050 executing on the node 1000 (e.g., shipping control applications, sensor interface applications, client management applications, security applications, power management applications, vehicle monitoring applications, location services applications, user interface applications, etc.).

The example node 1000 may also comprise one or more Processors 1080 and Memory Devices 1090. The Processor(s) 1080 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1090 may, for example comprise any of a variety of memory characteristics. For example, the Memory Device(s) 1090 may comprise a volatile memory, non-volatile memory, etc. The Memory Device(s) 1090 may, for example, comprise a non-transitory computer-readable medium that comprises software instructions that when executed by the Processor(s) 1080, cause the node 1000 to perform any or all of the functionality discussed herein (e.g., shipping control functionality, sensor interface functionality, mobility management functionality, communication functionality, connection (or communication pathway) selection, etc.).

In accordance with various aspects of this disclosure, by constructing a global network overview and setting the goal to maximize network overall performance instead of basing the network connections solely on the respective optimal self-interested decisions of individual nodes, Fixed APs will generally not be forced to tolerate more data than they can effectively handle. The existence of a prediction model provided not only with real-time information, but also with the overall network view and historical network utilization and/or performance information may provide for overall optimization and incremental learning (or model adaptation) over time. Additionally, the timing of network actions may also be optimized, for example to minimize the effects of disruptions Over a network of shared resources, for example where bandwidth allocation can assume a central role to avoid node congestion and where it is beneficial to ensure low data traffic costs, a system that enables load balancing over different Fixed APs presents itself as an asset to provide a better-informed connection decisions while selecting the best neighbor to connect to.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222, 077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No.

62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile and/or static nodes. As a non-limiting example, various aspects of this disclosure provide communication network architectures, systems, and methods for providing dynamic and predictive selection of communication pathways or connections in a communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for controlling communication pathway selection in a communication network, the system comprising:
   a first node; and
   a Mobile Access Point (MAP) for use in a vehicle,
   wherein the first node comprises at least one circuit configured to, at least:
      identify a recommended network connection for the MAP, the recommended network connection based at least in part on a connection recommendation model;
      communicate information indicating the recommended network connection to the MAP;
      receive feedback information from the MAP, said feedback information comprising information indicating whether the MAP established the recommended network connection; and
      adapt the connection recommendation model based, at least in part, on the received feedback information, and
   wherein the MAP comprises at least one circuit configured to, at least:
      receive the information indicating the recommended network connection from the first node;
      determine whether to establish the recommended network connection or to establish an alternative network connection; and
      if it is determined to establish an alternative network connection, then:
         establish the alternative network connection; and
         communicate the feedback information to the first node indicating that the MAP deviated from the recommended network connection.

2. The system of claim 1, wherein the at least one circuit of the first node is configured to
   identify the recommend network connection by, at least in part, operating to determine an optimized set of network connections for the communication network; and
   determine the optimized set of network connections for the communication network based, at least in part, on trajectory information for the vehicle.

3. The system of claim 1, wherein the information indicating the recommended network connection comprises information indicating a value of a parameter on which the identification of the recommended network connection was based.

4. The system of claim 3, wherein the at least one circuit of the MAP is configured to determine whether to establish the recommended network connection by, at least in part, operating to validate the value of the parameter on which the identification of the recommended network connection was based.

5. The system of claim 1, wherein the feedback information indicating that the MAP deviated from the recommended network connection comprises information indicating why the MAP deviated from the recommended network connection.

6. The system of claim 5, wherein:
   the information indicating the recommended network connection comprises information indicating a first value of a parameter on which the identification of the recommended network connection was based; and
   the feedback information indicating why the MAP deviated from the recommended network connection comprises information indicating a second value for the parameter that is different from the first value.

7. A system for controlling communication pathway selection in a communication network, the system comprising:
   a first node comprising at least one circuit configured to, at least:
      identify a recommended network connection for a Mobile Access Point (MAP) for use in a vehicle, based at least in part on a connection recommendation model wherein:
         the connection recommendation model is based on one or more communication network parameters and one or more node context parameters, and
         the connection recommendation model is configured based on an overall communication network cost function for the communication network, wherein the overall communication network cost function comprises characterizing a cost value for each direction for each connection between each two nodes in the communication network;
      communicate information indicating the recommended network connection to the MAP and describing one or more parameters utilized in determining the recommended network connection;
      receive feedback information from the MAP, said feedback information comprising information indicating whether the MAP established the recommended network connection; and
      adapt the connection recommendation model based, at least in part, on the received feedback information.

8. The system of claim 7, wherein the at least one circuit is configured to identify the recommend network connection by, at least in part, operating to determine an optimized set of network connections for the communication network.

9. The system of claim 8, wherein the at least one circuit is configured to determine the optimized set of network connections for the communication network by, at least in part, operating to optimize the overall communication network cost function for the communication network.

10. The system of claim 8, wherein the at least one circuit is configured to determine the optimized set of network connections for the communication network based, at least in part, on trajectory information for the vehicle.

11. The system of claim 7, wherein the information indicating the recommended network connection comprises information indicating a value of a parameter on which the identification of the recommended network connection was based.

12. The system of claim 11, wherein the received feedback information comprises information indicating that the MAP established the recommended network connection, and information verifying the value of the parameter.

13. The system of claim 11, wherein the received feedback information comprises information indicating that the MAP established the recommended network connection, and information indicating that the value of the parameter that was communicated to the MAP is incorrect.

14. The system of claim 11, wherein the received feedback information comprises information indicating that the MAP did not establish the recommended network connection, and information indicating that the value of the parameter that was communicated to the MAP is incorrect.

15. The system of claim 7, wherein the received feedback information comprises information indicating why the MAP did not establish the recommended network connection.

16. The system of claim 15, wherein the at least one circuit is configured to adapt the connection recommendation model based, at least in part, on the information indicating why the MAP did not establish the recommended network connection.

17. A system for controlling communication pathway selection in a communication network, the system comprising:
a Mobile Access Point (MAP) for use in a vehicle, the MAP comprising at least one circuit configured to, at least:
receive information from another node of the communication network, the received information comprising information indicating a recommended network connection for the MAP and one or more parameters on which the identification of the recommended network connection was based;
verify based on real-time information, one or more conditions or characteristics relating to the recommended network connection and/or the one or more parameters;
determine whether to establish the recommended network connection or to establish an alternative network connection, wherein:
the determining is based at least in part on the one or more conditions or characteristics; and
the determining is based on one or both of:
a determination that at least one of the one or more conditions or characteristics changed after the identification of the recommended network connection, and
a determination that at least one of the one or more conditions or characteristics was not included or used in the identification of the recommended network connection; and
if it is determined to establish an alternative network connection, then:
establish the alternative network connection; and
communicate feedback information to the other node indicating that the MAP deviated from the recommended network connection.

18. The system of claim 17, wherein the feedback information indicating that the MAP deviated from the recommended network connection comprises information indicating why the MAP deviated from the recommended network connection.

19. The system of claim 18, wherein:
the information indicating the recommended network connection comprises information indicating a first value of a parameter on which the identification of the recommended network connection was based; and
the feedback information indicating why the MAP deviated from the recommended network connection comprises information indicating a second value for the parameter that is different from the first value.

20. The system of claim 17, wherein the received information comprises information describing at least one parameter on which identification of the recommended network connection was based.

21. The system of claim 20, wherein the information describing at least one parameter on which identification of the recommended network connection was based comprises context information for the vehicle.

22. The system of claim 17, wherein the at least one circuit is configured to determine whether to establish the recommended network connection by, at least in part, operating to validate a parameter on which identification of the recommended network connection was based.

23. The system of claim 22, wherein the parameter comprises context information of the vehicle.

24. The system of claim 22, wherein the at least one circuit is configured to validate the parameter by, at least in part, operating to determine whether the parameter is within an acceptance range of a corresponding value for the parameter determined by the MAP.

25. The system of claim 17, wherein the at least one circuit is configured to determine whether the mobile node is allowed to deviate from the recommended network connection.

26. The system of claim 17, wherein the at least one circuit is configured to determine whether to establish the recommended network connection based, at least in part, on a parameter on which the recommended network connection was not based.

* * * * *